United States Patent
Bortman Rozenchan

(10) Patent No.: US 12,491,247 B2
(45) Date of Patent: Dec. 9, 2025

(54) BISPECIFIC IN TANDEM RECEPTOR CAR AND METHOD FOR MODULATING THE TUMORAL MICROENVIRONMENT

(71) Applicants: CELLURIS PARTICIPACOES LTDA, Sao Paulo (BR); CELLURIS GMBH, Zug (CH)

(72) Inventor: Patricia Bortman Rozenchan, Sao Paulo (BR)

(73) Assignee: CELLURIS LLC, Lewes, DE (US)

( * ) Notice: Subject to any disclaimer, the term of this patent is extended or adjusted under 35 U.S.C. 154(b) by 1031 days.

(21) Appl. No.: 17/420,739

(22) PCT Filed: Jan. 7, 2019

(86) PCT No.: PCT/BR2019/050003
§ 371 (c)(1),
(2) Date: Jul. 6, 2021

(87) PCT Pub. No.: WO2020/142815
PCT Pub. Date: Jul. 16, 2020

(65) Prior Publication Data
US 2024/0207404 A1 Jun. 27, 2024

(51) Int. Cl.
| | |
|---|---|
| A61K 40/41 | (2025.01) |
| A61K 39/00 | (2006.01) |
| A61K 40/11 | (2025.01) |
| A61K 40/31 | (2025.01) |
| A61K 40/42 | (2025.01) |
| C07K 14/725 | (2006.01) |
| C07K 16/28 | (2006.01) |
| C07K 16/30 | (2006.01) |

(52) U.S. Cl.
CPC .......... *A61K 40/41* (2025.01); *A61K 39/0011* (2013.01); *A61K 40/11* (2025.01); *A61K 40/31* (2025.01); *A61K 40/421* (2025.01); *A61K 40/4211* (2025.01); *A61K 40/4215* (2025.01); *A61K 40/4217* (2025.01); *A61K 40/4255* (2025.01); *C07K 14/7051* (2013.01); *C07K 16/2803* (2013.01); *C07K 16/2866* (2013.01); *C07K 16/2878* (2013.01); *C07K 16/30* (2013.01); *A61K 2239/29* (2023.05); *C07K 2317/31* (2013.01); *C07K 2317/622* (2013.01); *C07K 2319/30* (2013.01)

(58) Field of Classification Search
CPC .................................................... A61K 35/17
See application file for complete search history.

(56) References Cited

U.S. PATENT DOCUMENTS

| | | | |
|---|---|---|---|
| 2003/0105000 A1* | 6/2003 | Pero | C07K 1/047 514/19.3 |
| 2005/0272655 A1* | 12/2005 | Mellis | A61K 45/06 424/85.2 |
| 2015/0038684 A1* | 2/2015 | Jensen | A61K 39/4631 530/391.9 |
| 2018/0256712 A1 | 9/2018 | June et al. | |

FOREIGN PATENT DOCUMENTS

WO     2017222593 A1    12/2017

OTHER PUBLICATIONS

O'Hear et al. (Haematologica. Mar. 2015; 100 (3): 336-44).*
Rudikoff et al. (PNAS USA, 1982, 79: 1979-1983) (Year: 1982).*
Coleman et al. (Research in Immunology, 1994; 145(1): 33-36) (Year: 1994).*
Burgess et al. (J of Cell Bio. 111:2129-2138, 1990) (Year: 1990).*
Guest et al. (J. Immunother. 2005 28: 203-211) (Year: 2005).*
Pizzitola, I. et. al. Chimeric antigen receptors against CD33/CD123 antigens efficiently target primary acute myeloid leukemia cells in vivo. Leukemia 2014. vol. 28, No. 8, pp. 1596-1605, doi 10.1038/leu.2014.62 doi: 10.1038/leu.2014.62. Abstract, Materials and Methods: section.
Giavridis, T. et al. CAR T cell-induced is cytokine release syndrome mediated by macrophages and abated by IL-1 blockade. Nat Med. 2018. vol. 24, No. 6, pp. 731-738 (19 pages). doi: 10.1038/s41591-018-0041-7. Cited in the description. Abstract, last paragraph of p. 4 to first paragraph of p. 5, Figure 4.
Shah, N. N. et al. Beyond Cytokine Storm: Optimizing Treatment Strategies to Target the Complex Interplay between CAR Mediated Inflammatory Response, Disseminated Intravascular Coagulation and Macrophage Activation Syndrome. Blood. 2017. vol. 130:1277, Suppl 1. ISSN: 0006-4971. E-ISSN: 1528-0020. See the whole document.

* cited by examiner

*Primary Examiner* — Peter J Reddig
(74) *Attorney, Agent, or Firm* — Scott Houtteman; HOUTTEMAN LAW LLC

(57) ABSTRACT

The present invention refers to a bispecific in tandem receptor CAR, named RfuCAR, which includes a scFv that recognizes and ligates surface molecules on tumoral cells (CD33, CD123 or another tumoral target) and the IL-1 receptor type 2 (IL-1R2). According to this, the IL-1R2 was chosen as the ideal receptor to compose the RfuCAR construction, being able to capture the IL-1β with high affinity and specificity. These proprieties indicate it as a good candidate to reduce the neurotoxicity and CRS effects of CAR-T therapies. Additionally, the present invention deals with a method for modulating the tumoral microenvironment, for example, in case of acute myeloid leukemia, or other cancer type like but not restricted to acute lymbloblastic leukemia, pancreatic, lung and ovarian cancer.

1 Claim, 14 Drawing Sheets

Specification includes a Sequence Listing.

BISPECIFIC IN TANDEM RECEPTOR CAR AND METHOD FOR MODULATING THE TUMORAL MICROENVIRONMENT

FIELD OF THE INVENTION

The present invention belongs to the field of Medicine, more precisely in the area of Immunology, cell, biology and molecular biology, and describes a bispecific in tandem receptor CAR, named RfuCAR, which includes a scFv that recognizes and ligates surface molecules on tumoral cells (CD33, CD123 or another tumoral target, like, but not restricted to CD19, Mesothelin and BCMA, and the IL-1 receptor type 2 (IL-1R2), as well as a method for modulating the tumoral microenvironment, for example, in case of acute myeloid leukemia, or other cancer type, like but not restricted to acute lymphoblastic leukemia, pancreatic, lung and ovarian cancers.

BACKGROUND OF THE INVENTION

Interleukin 1 Receptor (IL-1R)

The interleukin-1 (IL-1a and IL-U) is a prototypic multifunctional cytokine which, differently from other cytokines, is able to affect nearly every cell type concurrently or not with other cytokines or small mediator molecules (DINARELLO, 1996). This cytokine has pleiotropic effects as an immune and inflammatory mediator (DINARELLO, 1996; APTE et al., 2002).

The main members of IL-1 family consist of IL-1a, IL-U, IL-1 receptor antagonist (IL-1ra), IL-1 receptor type I (IL-1RI), IL-1 receptor type II (IL-1RII) and IL-1 receptor accessory protein (IL-1RAcP) (DINARELLO, 1996; DUNN et al., 2001). Other cytokines named IL-18, IL-1F5, IL-1F6, IL-1F7, IL-1F9 and other are also included in the IL-1 family (DUNN et al., 2001; DINARELLO, et al., 2010).

IL-1 family are cytokines that control the pro-inflammatory reactions in response to pathogen-associated tissue injury and damaged and/or danger-associated molecular patterns; therefore, are the major mediators of innate immune reactions (WEBER, et al., 2010).

IL-1 signaling and expression are tightly regulated events comprising of gene expression controlling, synthesis and secretion and also control of surface receptors, soluble receptors and receptor antagonists (DINARELLO, 1996). This cytokine has innumerous effects including fever, increased hepatic acute phase response, increased metastases, angiogenesis, increased antibody and lymphokine production, cartilage breakdown, proliferation of fibroblasts, smooth muscle and mesangial cells and increased HIV-1 gene expression (AURON, 1998).

IL-1 mediates the increase in endothelial adhesion molecules that facilitates the emigration of neutrophils into the tissues but also to the metastatic niche (VIDAL-VANACLOCHA, et al. 1996). This cytokine is also involved in the angiogenesis and vascular endothelial growth factor (VEGF) production (COXON, et al., 2002; VORONOV, et al. 2003; SONG, et al., 2003). The levels of all IL-1 family members are increased in acute myeloid leukemia (AML) patients, leading to a significant suppression of normal progenitors clonogenicity and disease progression (CAREY, et. al. 2017). In spite of the high sequence similarity between IL-1a and IL-1R (DUNN et al., 2001), there are remarkably differences in its biological actions: IL-1a reduces tumorigenicity by inducing antitumor immunity whereas IL-1R promotes invasiveness including tumor angiogenesis and immune suppression in the host (SONG, et al., 2003). This pro-tumorigenic effects of IL-1R were observed in different cancer models such as melanoma, mammary and prostate cancers and also tumoral cells and macrophages cultures (VORONOV, et al. 2003).

The deregulated or excessive activation of IL-1 receptors is the potential cause of dangerous and detrimental local or systemic inflammatory reactions, as well as autoimmune or allergic responses (BONECCHI, et al. 2016). Recently the role of IL-6 and IL-1 in the CRS and neurotoxicity induced by CAR-T therapy was demonstrated, indicating that IL-1 is a better target in order to control both of those adverse events (NORELLI, et al. 2018; GIAVRIDIS, et al. 2018; TARASEVICIUTE, et al. 2018). The blocking of IL-1 expression in patients with myeloma reduces IL-6 production and extends progression-free survival (LUST, et al. 2009). The IL-1 receptor antagonist (IL1-PA) has been applied to treat countless diseases, such as rheumatoid arthritis, asthma, septic shock, graft versus host disease, Alzheimer's disease, arteriosclerosis, multiple myeloma and adult T-cell leukemia (HALLEGUA, 2002). There is enough evidence to support IL-1 blockage as a good approach to treat human metastatic diseases (DINARELLO, et al., 1991).

IL-1 Receptors

There are two main receptors for IL-1, type I and II that are located in the long arm of chromosome two and encodes for a 552 amino acids long and 80 kDa and a 336 amino acids long and 68 kDa, respectively (DINARELLO, 1996; DINARELLO, et al. 1991). These two receptors are members of the immunoglobulin superfamily, each are composed of three IgG-like domains and share significant homology to each other (DINARELLO, 1996). The type 1 receptor is found primarily on T cells, endothelial cells, keratinocytes, hepatocytes and fibroblasts, whereas the type 2 receptor is found on neutrophils, B cells and bone marrow cells. However, it is likely that some cells can express both types (DINARELLO, et al. 1991).

The IL-1R1 and IL-1R2 have different affinities for the three main ligands of IL-1 family (IL-1a, IL-1R and IL-1RA). IL-1R1 binds IL-1a with higher affinity and in opposite IL-1R2 binds IL-1R with higher affinity. Also, IL-1R2 binds IL-1RA 100 less efficiently than IL-1R1 (MANTOVANI, et. al. 1998; COLOTTA, et al. 1993). IL-1R2 shares 28% aminoacid homology with the extracellular portion of IL-1R1 but differs for the absence of a TIR domain and for the presence of only a short 29 amino acid-long cytoplasmic tail (BONECCHI, et al. 2016; MCMAHAN, et al. 1991). The IL-1R2 is unable to transduce signal being a decoy receptor (AURON, 1998; THOMAS, et al. 2014). IL-1 acts on myelomonocytic cells through IL-1R1 and IL-1R2 inhibits this cytokine activity acting as a trap for IL-1 agonists (COLOTTA, et al. 1993). Type 2 soluble IL-1R inhibits IL-1R at two steps, by preventing processing of propeptide and by blocking the interaction of mature IL-1R with type 1 IL-1 receptor (SYMONS, et al. 1995; BOURKE, et al. 1995).

The IL-1R2 is increased in the presence of glucocorticoid hormones (e.g. dexamethasone), prostaglandins, aspirin, Th2 cytokines, IL-10 and IL-27 contributing to immunosuppressive and anti-inflammatory activities (BONECCHI, et al. 2016; R E, et al. 1994). The anti-inflammatory role of IL-1R2 was demonstrated in several diseases including chronic skin inflammation (RAUSCHMAYR, et al. 1997), arthritis (BESSIS, et al. 2000; DAWSON, et al. 1999; ATTUR, et al. 2000), endometriosis (KOUFACHE, et al. 2012; BELLEHUMEUR, et al. 2005; GUAY, et al. 2007), heart transplantation (SIMEONI, et al. 2007) and autoimmune myocarditis by Th17 cells (CHANG, et al. 2013).

Spacers and Linkers

The CAR-mediated T-cell recognition is defined by the antibody domain and is independent of MHC presentation. This recognition is extended to any target in which the antibody is available (CHMIELEWSKI, et al. 2013). The interactions are strongly influenced by the structure and density of the target molecule on the tumor and the location of the epitopes that is recognized indicating that the sequence between the scFv and the T-cell membrane is crucial and should provide flexibility (HUDECEK, et al. 2015). The length of spacer may vary according to the target molecule and this logical thinking can also be applied for the region between two recognition sites in bi-specific CARs (HUDECEK, et al. 2015; GRADA, et al. 2013; HEGDE, et al. 2016). Also, the spacer characteristics are key in the modulation of transgenic cell phenotype, activation status, migratory capacity, and tumor recognition affecting the CAR potency (WATANABE, et al. 2016; NORELLI, et al. 2016).

Many combinations of spacer have been tested on literature and the suitability of each one is directly related to the disease to be treated and the targets chosen (CHMIELEWSKI, et al. 2013). GRADA, et al. demonstrated that for CD19 and Her2 tandem CAR, the Her2-scFv must be put in a justa-membrane position and the CD19-scFv in the distal position to allow for more relaxed and potentially simultaneous binding (GRADA, et al. 2013). A CAR that targets carcinoembryonic antigen (CEA) has the same behavior as CD19-scFv demonstrating a higher degree of T-cell activation when targets epitopes closer to the cell membrane (HOMBACH, et al. 2000). This is also reported for CARs targeting other epitopes (GUEST, et al. 2005; JAMES, et al. 2008).

These findings corroborate the kinetic-segregation model that suggests that targeting membrane distal epitopes increase the CAR-ligand clusters, which permits a more intense entering of phosphatases molecules in the synapse and repression of TCR signaling than proximal epitopes (DAVIS, et al. 2006). However, this model does not exclude the need for accessible and flexible epitopes, indicating that the best suitable target epitope and binding affinity for optimal. CAR T-cell activation remains so far to be empirically evaluated in each case (CHMIELEWSKI, et al. 2013).

The specific requirements of the spacers or non-antigen binding components of the CAR in the extracellular domain must be carefully chosen and proven in vitro and in vivo (HUDECEK, et al. 2015). Some differences can be observed in the most characterized CD19-CAR as the antitumor efficacy is greater when a short spacer sequence derived from CD8c links the scFv to the intracellular signaling domains (PORTER, et al. 2011; KALOS, et al., 2011) than a IgG1 hinge and Fc (HUDECFK, et al. 2015; SAVOLDO, et al. 2011) or without a spacer (REN-HEIDENREICH, et al. 2000; MORITZ, et al. 1995). Patel (PATEL, et al. 1999) reported that CARs targeting $HIV_{env}$ containing CD7 or IgG1-derived spacers demonstrated optimal cell lysis compared to CARs containing CD8, truncated CD4 or truncated IgG1-derived spacer; reinforcing that the spacer choice must be disease and target specific.

The previous works indicate that even if the spacer domain could provide flexibility for the extracellular domain increasing the distance from membrane, or from other antigen-binding domain, it can impair the T-cell activation, demonstrating that the improvement of binding will not necessarily result in increased CAR signaling (HOMBACH, et al. 2000; HAWKINS 2014). The controversial data in the literature, strongly varying between different targeted CARs indicates the requirement of in vitro and in vivo putative constructions testing.

Linkers, Spacers and Hinges

Gly-Ser Linker

Grada (GRADA, et al e 2013) constructed a tandem CAR for CD19 and Her2. The spacer/linker between the two recognition motifs were a sequence of glycin and serine aminoacids. Tandem repeats occur in at least 14% of the proteins with less than 2,000 residues and do not form the standard secondary structures, such as a-helix or 13-sheets (MATSUSHIMA, et al. 2006). Indicating that Gly-Ser tandem repeats are highly flexible and non-cleavable allowing for near-free motion of the CAR subunits (MATSUSHIMA, et al. 2008). The tandem repeats seem to allow a structural flexibility that enables the interaction with various ligands including metal ions and other proteins (MATSUSHIMA, et al. 2006).

IgG1

The IgG1 is the most abundant immunoglobulin class and for instance is widely applied as spacer in CAR constructions (VIDARSSON, et al. 2014). The spacer can comprise the whole IgG1 Fc domain (CH2CH3), Fc domain and hinge or only the hinge. The hinge comprises a 15 aminoacids between CH1 and CH2 domains (VIDARSSON, et al. 2014). Guest et al demonstrated that the IgG1 Fc domain space is not necessary for CD19 CAR optimal function (GUEST, et al. 2005) and can abrogate efficacy of CD19 CAR-T cell in mice (ALMASBAK, et al. 2015). Also, Hombach (HOMBACH, et al 2000) demonstrated that extracellular IgG1 domains impairs antigen dependent cellular activation in an anti-CD30 model. On the other hand, several authors have efficient CAR constructions with IgG1 Fc domains, i.e. CAR-PSCA and CAR-MUC1 (ANURATHAPAN, et al. 2014), NGFR-spaced-CD44v6, NGFR-spaced-CD19 and NGFR-spaced-CEA (CASUCCI, et al. 2015; CASUCCI, et al. 2018), CAR-PSA (WATANABE, et al. 201.6). Moritz (MORITZ, et al 1995) have tested different constructions using hinge domains between function CAR regions. One of the concerns of IgG1 Fc application is that this domain is responsible for the complement cascade activation and it is enhanced when the antibody Fab domain is deleted (WANG, et al., 2016). In spite of putative effects of Fc chain in immune activation, experimental results using IgG1 indicates it can be a good spacer candidate, but it's effects probably will be only detected in the experimental assays.

IgG4

The IgG4 class is less abundant than IgG1, having a very similar structure differing on the hinge domain size (12aa) (VIDARSSON, et al. 2014). The IgG4 antibodies are often formed following repeated or long-term exposure to antigen in a non-infectious setting (VIDARSSON, et al. 2014). IgG4 is functionally monovalent, which indicates it is less suitable to undesirable crosslinks (AALBERSE, et al. 2002). Probably due these characteristics IgG4 Fc and hinge were already being applied in CAR constructions. Generally, the IgG4 sequence is applied with hinge and Fc CH2CH3 domains (QIN, et al. 2017) or composed with sequences from other IgGs. The replacement of the first six amino acids of the CH2 domain of IgG4 (APEFLG) with the corresponding five amino acids of IgG2 (APPVA) abrogates binding to Fc receptor and is necessary for tumor recognition in vivo (HUDECEK, et al. 2015). The need for alterations on IgG4 CH2 region were reported by other authors, which mutated the CH2 region in two sites (L235E; N297Q) and incorporate a deletion (CH2 residues 235 and 297) leading to reduction on Fc receptor binding without altering the ability of the CAR to mediate antigen-specific lysis (JONNAL-AGADDA, et al. 2015). Deletions and mutations on IgG4 CH2 portion abolish cell cytotoxicity and strongly reduced the complement activation by IgG4 (MONTANO, et al. 2002; DORAI, et al., 1992).

Other Spacers

The CD4, CD8 and CD28 trans-membrane and hinge are widely applied in CAR constructions (NORELLI, et al. 2016). In a CD19 CAR, the hinge and trans-membrane regions from either CD8c or CD28 have similar function in mice, but CD8a seems to have lower levels of inflammatory cytokine production and activation-induced cell death (REN-HEIDENREICH, et al. 2000; ALABANZA, et al. 2017). These motifs usually are applied as spacers between scFv and T-cell membrane in monospecific CARs.

Acute Myeloid Leukemia CAR Tested Spacers

According to the information discussed above, we choose the IgG4 Fc domain and hinge, including its variations (Hinge only, Hinge-CH2CH3 and CH2CH3 only) to apply as a spacer between the scFv receptor and IL1-R2 receptor in the RfuCAP construction. As shown previously this spacer is less reactive and seems to not interfere in the CAR regular function (JONNALAGADDA, et al. 2015; MONTANO, et al. 2002; DORAI, et al. 1992; JENA, et al. 2010). Also, is important to relate the spacer to the targeted disease of RfuCAR, so, for other tumoral targets we may change this option by any other spacer that presents better suitability. The first disease to be treated will be acute myeloid leukemia (AML) with the anti-CD33 and anti-CD123 CARs. On that regard, the use of IgG4 Fc and hinge has been also tested in other constructions. Many authors have successfully used the IgG4 Fc and hinge as spacer in CD33 (KENDERIAN, et al. 2015), CD123 (MARDIROS, et al. 2015; THOKALA, et al. 2016) and other targets (LABORDA, et al. 2017) CAR-Ts against AML (KENDERIAN, et al. 2017) (CD33 and CD123 Novartis Patents).

PRIOR ARTS

It is noticed that the use of genetically modified chimeric T-cell receptor antigens expressing CD33 and/or CD123 antigens for the treatment of cancer has been of considerable interest to the scientific community in recent years. For example:

The document US 2013/280220 A1 refers to computational modeling tools to guide the design and construction of a novel single CAR molecule (TanCAR), recognizing each target molecule individually, capable of mediating the bispecific activation and targeting of T cells. Accordingly, with the fourth paragraph of this document: the present invention is directed to methods and compositions related to cell therapy. In particular embodiments the cell therapy is for cancer including solid tumors. However, the inventors use Glycine, Serine or both as linkers. The construct of the present invention uses IgG4 Fc domain as a spacer between the scFv receptor and L1-R2 receptor and CD8 hinge as spacer between scFv and T-cell membrane in the RfuCAR construction, in addition to have different targets.

The document WO 2014/186469 A2 relates to methods and compositions for immunotherapy employing a modified T cell comprising a clinical grade antigen chimeric (CAR) receptor, which can be directly administered to the cancer treatment. With those modifications the invention will now have the ability to recycle effector functions within the tumor microenvironment. However, the inventors used transposon system to transduce T cells, we are using lentiviral vectors. Besides, they did not construct CARs using two different receptors at the same time for different targets, instead, they fused a mutein IL15 with a CD19 receptor in the construct.

The document WO 2014/055442 A2 relates to compositions and methods for the treatment of human cancer. The methodology of this document directs cells to a tumor microenvironment and includes a Chimeric Antigen Receptor (CAR) comprising an antigen binding domain, a trans-membrane domain, a costimulatory signaling region and a zeta CD3 signaling domain, wherein the antigen-binding domain binds to a stromal cell antigen. Although the inventors for this patent want to affect the tumor microenvironment, they try to achieve this in a different manner than the RfuCAR of the present invention. While we want to reduce the IL-1 present in the microenvironment, the present invention comprises of an antigen-binding domain that binds to a stromal cell antigen, for example FAP (fibroblast activation protein).

The document WO 2017/222593 A1 relates to compositions and methods related to chimeric antigen receptors. More precisely, this document relates to genetically modified cells having the chimeric antigen receptors directed to at least two targets, for example, CD33 and CD123, among numerous others. However, such document presents a different way to construct the CAR, in the same CAR construct they insert two antigen recognition sites, also, they put a fused protein in the construct to serve as an enhancer. Our CAR presents two different receptors linked among each other. Their switch off mechanism is achieved through a suicide gene, RfuCAR has an on/off switch as well as the possibility of fine tuning the responses.

The document U.S. Pat. No. 9,815,901 B2 relates to the treatment of diseases related to CD123 expression. To this end, the document relates to a chimeric antigen receptor specific for CD123, in addition to proposing methods for the administration of genetically modified cells expressing the CD123 binding domain. Such document differs from the present invention in that it does not suggest the construction of chemical receptors, only mentioning it as being the recognition of CD123 antigens for the treatment of diseases related to the expression of such antigen. Additionally, this construct uses Glycine/Serine as linker. Also, they constructed a CAR which pursue an antigen recognition site for CD123 and CD19. The activation of this CAR occurs just when two antigens were linked by receptors. In order to control toxicity, the authors propose a dimerization switch, in which the signal transduction produced by the CART recognition will only be transmitted in the presence of a molecule that will perform a dimerization of the two CART parts. In the present invention, it is proposed a regulation of the immune microenvironment through the sequestration of IL-1 from the tumor microenvironment, and the possibility to manage the toxicity through the administration of peptides directed to the receptors described.

The document WO 2017/173256 A1 relates to compositions and methods comprising genetically modified immune cells expressing antigen (CAR) receptors or T-cell receptors (CAR-T) which are specifically directed to kill cancer cells. Although this document mentions immunotherapy by CAR-T, it is not specific for the recognition of the CD33 and CD123 antigens, also does not target the construction of chimeric receptors using such genetically modified cells, as in the present invention. In addition, the CAR construct comprised in this document consists of a single antigen site and a truncated hinge domain. The targets used in such document are different from that of the present invention.

The document WO 2015/164594 A1 is related to chimeric antigen receptors directed to cells expressing an antigen. This document refers to therapy with modified T cells, although these are not necessarily for the recognition of CD123 or CD33 antigens. Additionally, such document is related to a CART-cell targeting the EGFR antigen. In addition, they insert a second transgene, a sequence for IL15/IL15Ra fusion protein expression. The construction was made for work through the density of the target.

The document entitled "Engineering chimeric antigen receptor-t cells for cancer treatment" makes an analysis on therapy with chimeric antigen receptor (CAR) cells that has been successfully applied in the treatment of B cell malignancies, highlighting its great potential in antitumor therapy. CAR-T cells can be designed to kill malignant cells specifically or remodel the tumor microenvironment by releasing soluble factors that regulate the function of stromal cells or immune cells, providing a powerful tool for targeting multiple components of the tumor ecosystem. Such document is a literature's review for CART-cell technology. It describes the concepts of tumor ecosystem, the distinct cancer-immune phenotype and the T-cell exhaustion mechanisms in immune evasion. It's also reviewed the functional challenges of CART-cell technology. At any moment it is cited the immune regulation mechanism that are proposed in the present invention.

The document entitled "Perspectives on chimeric antigen receptor t-cell Immunotherapy for solid tumors" relates to specific chimeric antigen receptors CARs, which can cause robust activation of T cells to initiate the killing of the target tumor cells. This document describes some recent approaches and innovations for the genetic re-engineering of CARs T cells to combat the inhibitory influences found in the tumor microenvironment. In addition, they mention the difficulties on treating solid tumors and that tumor microenvironment could help with this matter. So, this publication supports the present invention.

The document entitled "T cells expressing CD123-specific chimeric antigen receptors exhibit specific cytolytic effector functions and antitumor effects against human acute myeloid leukemia" relates to chimeric antigens receptors specific for CD123 expressed on T cells, exhibiting specific cytolytic effector functions and antitumor effects against acute myeloid leukemia. As mentioned, the receptor suggested in this document is specific for the recognition of the CD123 antigen. However, such document is an experimental article where they designed two distinct epitopes for CD123 to be used in the constructions. Although the CART design of the article is similar to ours, same IgG4 Fc receptor hinge, CD28 used as co-stimulatory and CD3 zeta as signaling transducer, our CART design also contemplates the use of a second co-stimulatory molecule, 4-1BB. Another major difference of our CART is the immune microenvironment regulation mechanism that we propose; the paper's CART design does not contemplate any mechanism related to that function.

The document entitled "Switching CAR t cells on and off: a novel modular platform for retargeting of t cells to AML blasts" demonstrates that CD33 and CD123 are expressed either alone or in combination in patients with acute myeloid leukemia (AML) and thereafter a treatment against AML with chimeric T cell antigen receptors expressing both CD33 and CD123 was suggested. This document is very similar with the present invention since it suggests the use of genetically modified T cells which recognize the CD123 and/or CD33 antigens for the treatment of acute myeloid leukemia. Such paper shows a modular CAR construct, with dual targeting modules against the tumoral antigen, that can be switched on/off by its proper kind of construction. The construction of the present invention is made using two very different receptors, one for the tumoral antigen and the other one for IL-1RA, specifically.

In view of the above, it is concluded that the construct (RfuCAR) proposed in the present application is different from any other constructs because it comprises a mechanism that is able to modulate the tumoral microenvironment and also be switched-off by the administration of both receptor epitope peptides, constituting a regulatory safety switch, using as receptors the IL-1R2, which was not used for this end yet, besides the tumoral receptor target. If any of the toxic CAR-T effects are detected in the patient, the RfuCAR cells action can be transiently switched-off and also tuned by the administration of different peptides that link to IL-1R2, IL-1-IL-1R2 and/or scFv epitopes. These peptides will be able to link the two RfuCAR preventing the ligation to tumoral cells and/or IL-1 inhibiting or modulating RfuCAR activity. The RfuCAR cells will still be able to proliferate in the patient and get back to kill tumoral cells as soon as the administration of the peptides ceases. Accordingly, the construct and mechanism of the present invention are a novel approaches that aims at regulating the tumoral microenvironment not only through the cell signaling pathway, but also to the secreted molecules from macrophages and other cells.

SUMMARY OF THE INVENTION

The present invention has the purpose to propose a bispecific in tandem receptor CAR, named RfuCAR, which includes a scFv that recognizes and ligates surface molecules on tumoral cells (CD33, CD123 or another tumoral target, like but not restricted to CD19, Mesothelin, BCMA) and the IL-1 receptor type 2 (IL-1R2), as well as a method for modulating the tumoral microenvironment.

RfuCAR construct and mechanism is a novel approach that aims at regulating the tumoral microenvironment not only through the cell signaling pathway, but also to the secreted molecules from macrophages and other cells. In silico and in vitro tests are being conducted in order to corroborate the advantages of Celluris RfuCAR applications.

DETAILED DESCRIPTION OF THE INVENTION

Figure 1:
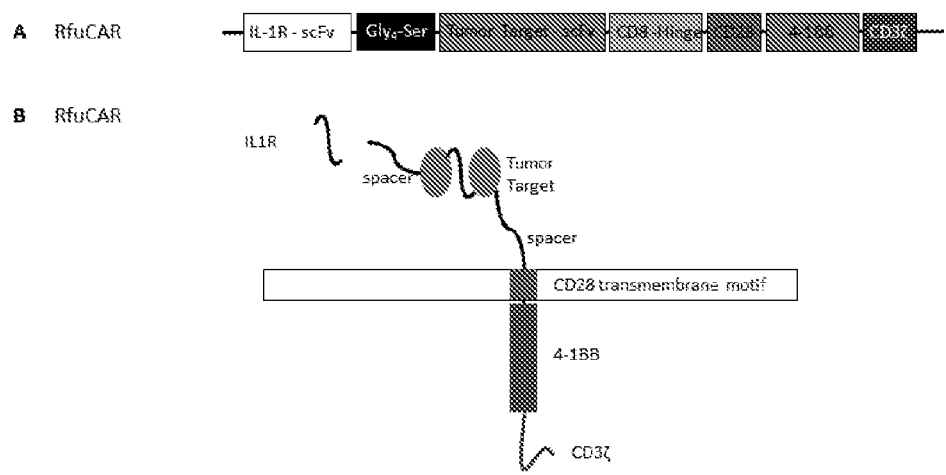
FIG. 1 presents the schematic of RfuCAR structure, wherein A is the vector scheme; and B is the Rfu scheme.

The present invention describes a bispecific in tandem receptor CAR, named RfuCAR, which includes a scFv that recognizes and ligates surface molecules on tumoral cells (CD33, CD123 or another tumoral target, like but not restricted to CD19, Mesothelin, BCMA) and the IL-1 receptor type 2 (IL-1R2), as well as a method for modulating the tumoral microenvironment. Additionally, such mechanism is able to be switched-off by the administration of both receptor epitope peptides, constituting a regulatory safety switch (FIGS. 1 A and B).

The scFv motif will ligate the tumoral cell and lead them to apoptosis exactly as a third generation CAR works. The secreted IL-1p will be trapped binding in the IL-1R of RfuCAR inhibiting the binding to the IL-1R1 and IL-1 signaling transduction. This inhibition will decrease the IL-1 pathway activation leading to the modulation of tumoral cell proliferation. Regulation of IL-1 content in the microenvironment will modulate other cytokines activation in the tumoral environment, putatively preventing the oversecretion of cytokines observed in CRS and neurotoxicity events.

Figure 2:
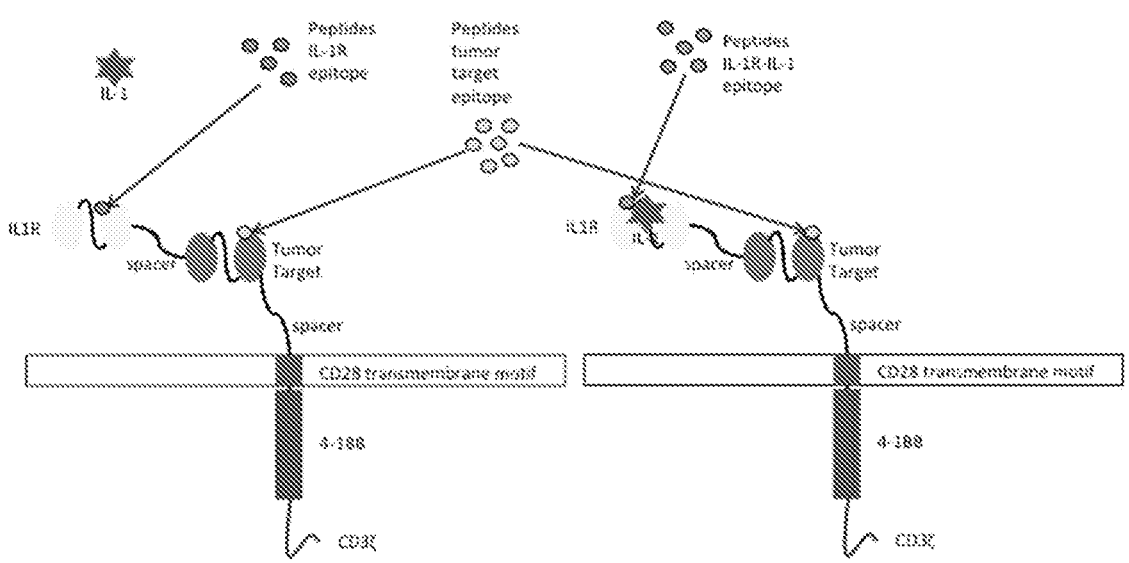
FIG. 2 presents the scheme demonstrating the switch and tuning of RfuCAR. The combination of peptides can switch-off or modulate the RfuCAR action. Peptides to IL-1R and Tumor Target, Peptides to IL-1R-IL-1 and Tumor Target and both three peptides can switch-off RfuCAR. The administration of only one of the peptides modulates the RfuCAR action.

If any of the toxic CAR-T effects are detected in the patient, the RfuCAR cells action can be transiently switched-off and also tuned by the administration of different peptides that link to IL-1R, IL-1-IL-1R and/or scFv epitopes (FIG. 2). These peptides will be able to link the two RfuCAR preventing the ligation to tumoral cells and/or IL-1 inhibiting or modulating RfuCAR activity. The RfuCAR cells will still be able to proliferate in the patient and get back to kill tumoral cells as soon as the administration of the peptides ceases.

RfuCAR Putative Structures

The extracellular putative structures of RfuCAR were tested in two structure prediction online features—IntFold (MCGUFFIN, et al. 2010; MCGUFFIN, et al. 2018; MCGUFFIN, et al. 2015; BUENAVISTA, et al. 2012; ROCHE, et al. 2012) and RaptorX (KALLBERG, et al. 2012; M A, et al. 2012; PENG, et al. 2011; PENG, et al. 2011; M A, et al. 2013). These features compare the submitted primary structure with characterized secondary and tertiary structures in the PDB database predicting the putative structure and given scores to indicate the similarity. Also, they provide disorder regions and putative binding sites.

For the data interpretation, the following points should be taken into account:

RaptorX

Score: is the alignment score falling between 0 and the (domain) sequence length, with 0 indicating the worst. In practice, Score may slightly go beyond the sequence length due to estimation error.

uSeqID and SeqID: is the number of identical residues in the alignment. SeqID is uSeqID normalized by the protein (or domain) sequence length and multiplied by 100. The higher the uSeqID (SeqID), the better. If the SeqID>30% and the protein (or domain) has >200 residues, it usually indicates that the predicted model has a correct fold.

uGDT and GDT: uGDT is the unnormalized GDT (Global Distance Test) score defined as $1*N(1)+0.75*N(2)+0.5*N(4)+0.25*N(8)$, where $N(x)$ is the number of residues with estimated modeling error (in A) smaller than x. GDT is calculated as uGDT divided by the protein (or domain) length and multiplied by a 100. uGDT(GDT) measures the absolute model quality. For a protein with >100 residues, uGDT>50 is a good indicator. For a protein with <100 residues, GDT>50 is a good indicator. If a model has good uGDT (>50) but bad GDT (<50), it indicates that only a small portion of the model may be good.

P-value: is the likelihood of a predicted model being worse than the best of a set of randomly-generated models for this protein (or domain), so P-value evaluates the relative quality of a model. The smaller the P-value, the higher quality the model. For mainly alpha proteins, P-value less than $10^{-3}$ is a good indicator. For manly beta proteins, P-value less than $10^{-4}$ is a good indicator.

IntFold

The results table is ranked according to decreasing global model quality score. The global model quality scores range between 0 and 1. In general scores less than 0.2 indicate there may be incorrectly modelled domains and scores greater than 0.4 generally indicate more complete and confident models, which are highly similar to the native structure. Each model is also assigned a color coded confidence level depending on the p-value:

| P-value cut-off | Confidence | Description |
|---|---|---|
| p < 0.001 | CERT | Less than a 1/1000 chance that the model is incorrect. |
| p < 0.01 | HIGH | Less than a 1/100 chance that the model is incorrect, |
| p < 0.05 | MEDIUM | Less than a 1/20 chance that the model is incorrect. |
| p < 0.1 | LOW | Less than a 1/10 chance that the model is incorrect. |
| p > 0.1 | POOR | Likely to be a poor model with little or no similarity to the native structure. |

The confidence scores should be considered in conjunction with the local model quality (per-residue scores) and the coverage of the target protein by the template/templates. The per-residue scores indicate the predicted distance (in Angstroms) between the CA atom of the residue in the model and the CA atom of the equivalent residue in the native structure.

The 3D cartoon view of the model that is color-coded with the residue error according to the RasMol temperature coloring scheme.

Disorder prediction—The image shows a plot of the probability of disorder (on the y axis) for each numbered amino acid in the sequence (on the x axis). The disorder/order probability threshold is shown as a dashed line on the plot. Residues above the threshold could be considered as mostly disordered and below as mostly ordered, however this threshold serves only to guide the user.

Domain boundary prediction—The image shows the top predicted 3D model colored to indicate predicted domains—a change in color indicates a likely domain boundary.

Binding site prediction—The image shows the top predicted 3D model annotated to indicate putative binding site residues. The cartoon view of the model is shown in green and the binding site resides are shown as blue sticks with labeled residues. A list of the binding residues is provided along with the most likely (numerous) ligand, the ligand identified at nearest to the center of the predicted binding pocket and a list of the likely interacting ligands and the number of each that were identified in related template structures.

RfuCAR Anti-CD33

Figure 3:
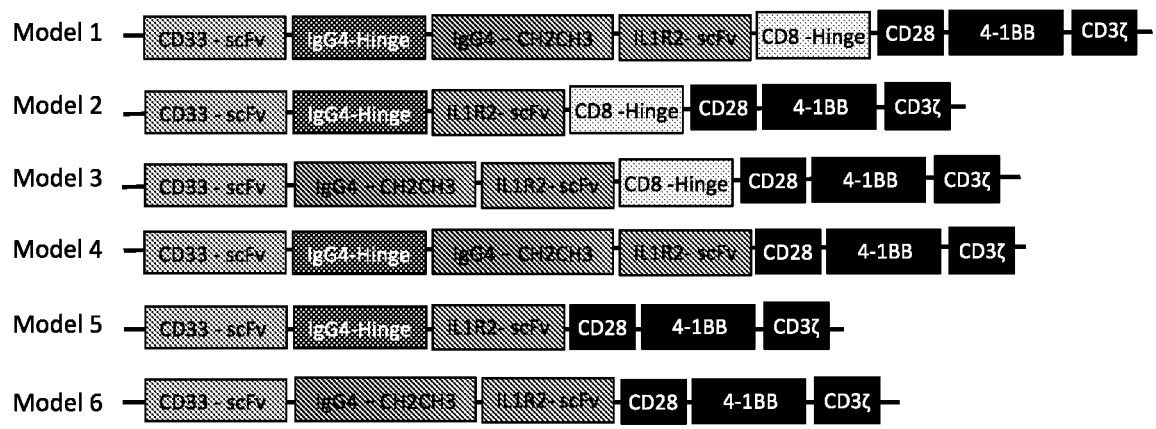
FIG. 3 presents the schematic view of putative anti-CD33 RfuCAR.

The tested models for RfuCAR anti-CD33 were described in the FIG. 3 and the sequences used are represented by SEQ. ID. Nos. 1 to 6. The schemes of colors are the same in the schematic view and in the sequences.

Figure 4:
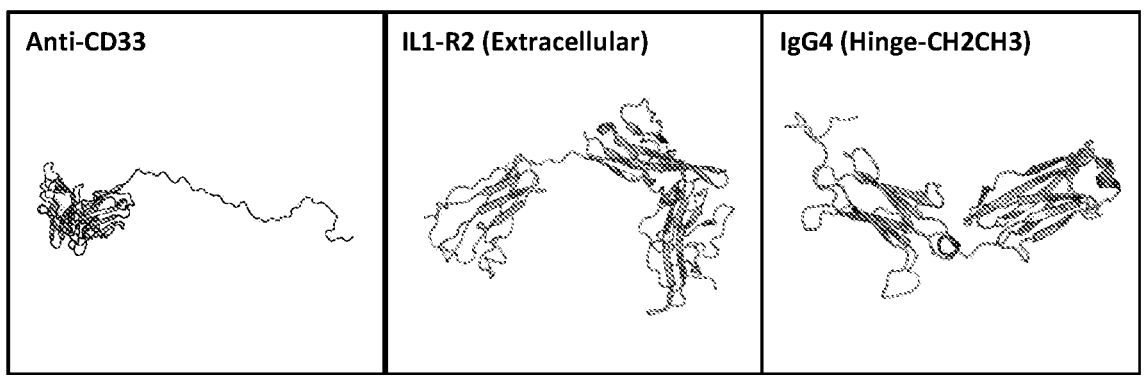
FIG. 4 presents the predictive structures (RaptorX) for Anti-CD33 scFv domain, IL1-R2 extracellular domain and IgG4 Hinge-CH2CH3 domains.
Figure 5:
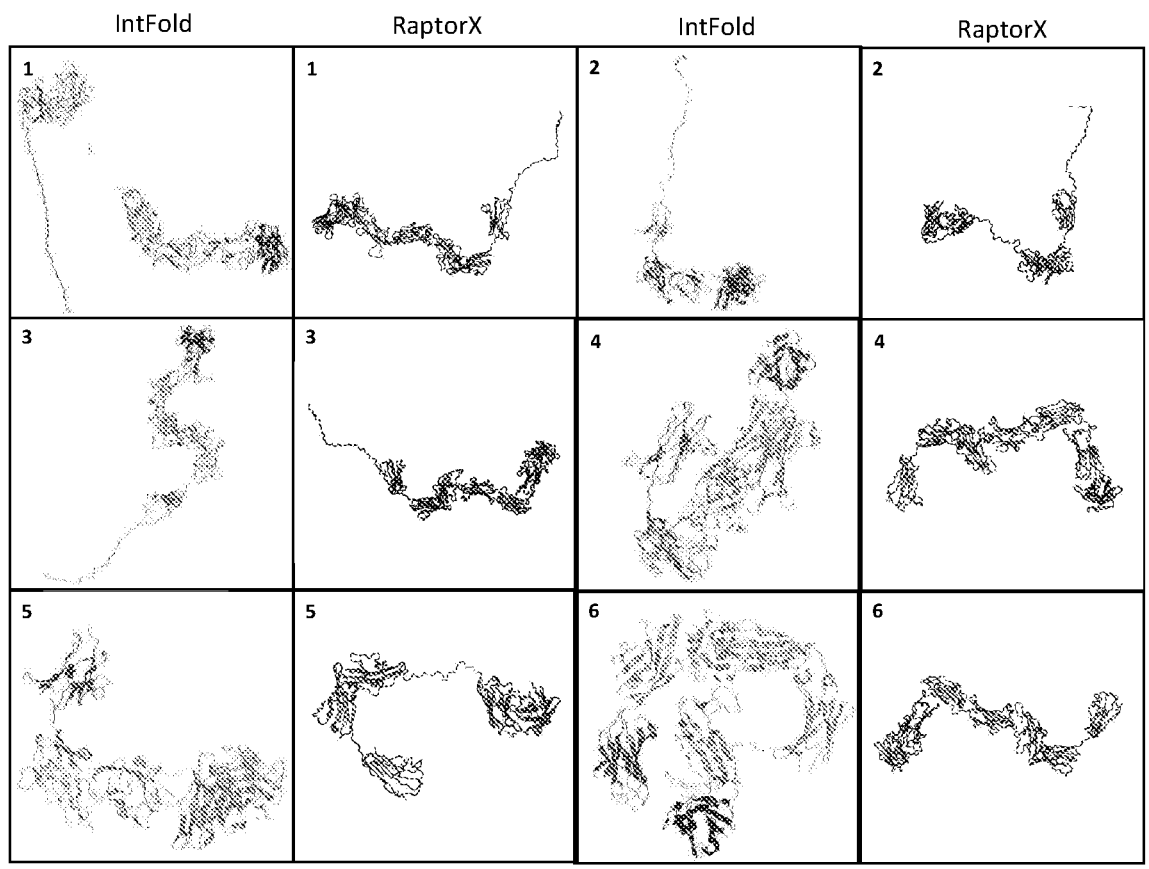
FIG. 5 presents the tridimensional models for the tested sequences of extracellular domain of anti-CD33 RfuCAR. The numbers in the boxes corresponds to the model number 1 to 6. Are shown the best matched model for each construction in the two softwares: IntFold and RaptorX.

The tested sequences generated the following tridimensional predictive structures for each domain alone (FIG. 4) and for the putative constructions (FIG. 5).

Figure 6:
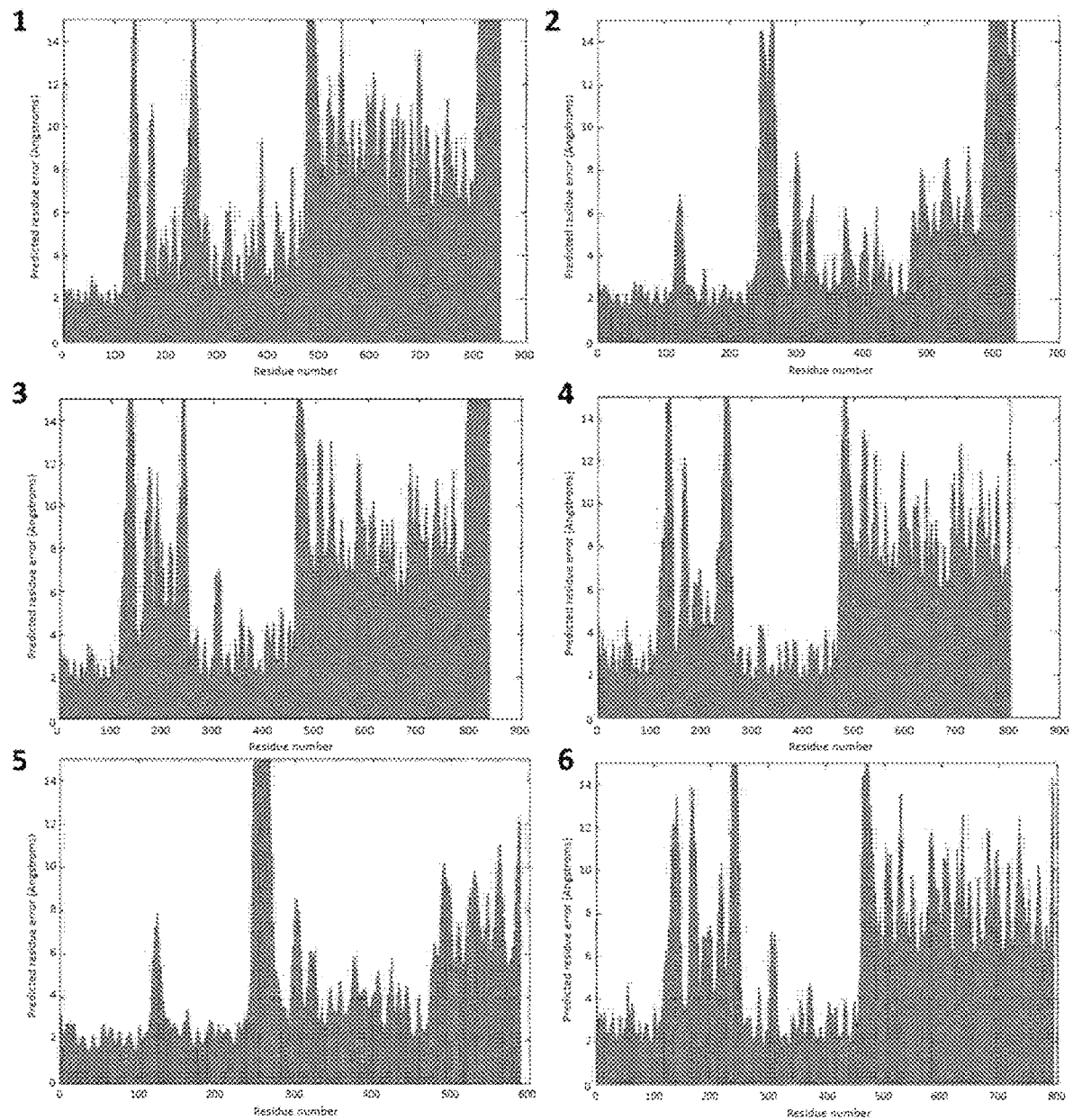
FIG. 6 presents the quality plots for all the best matches for each model for CD33-RfuCAR models (1-6)

Apparently, the structure of model 2 (represented by SEQ. ID. No. 2) is the one that maintains the adequate structure of the included components. It is corroborated by the technical data reported by each software compiled in the tables 1 (Domains alone) and table 2 (Anti-CD33 RfuCAR models). The model 2 has the best quality score (0.4465) in IntFold, when compared to the other models. This score is not high but sufficient to indicate a good structural prediction. Also, the analysis of the quality plots (FIG. 6) for all models indicate that the mismatches between the primary sequence of the model and the matched templates are minor in the model 2, indicating a more accurate prediction.

TABLE 1

Results for predictive tridimensional structures for each component of RfuCAR tested alone on RaptorX software.

RaptorX

| Component | Templates Matched | Position | p-value | uGDT (GDT) | uSeqId (SegId): | Score | Overall uGDT (GDT): | Disordered Positions (number/%) |
|---|---|---|---|---|---|---|---|---|
| IL1-R2 Extracellular | 3o4o:C | 1-330 | 2.41e−13 | 263 (80) | 314 (95) | 218 | 263 (79) | 15 (4%) |
| IgG4 (Hinge-CH2CH3) | 5dk3:B | 1-229 | 2.53e−10 | 182 (80) | 212 (93) | 156 | 182 (79) | 24 (10%) |
| Anti-CD33 | 5lxaH 6ehyA 5aawA | 1-290 | 4.25e−11 | 194 (67) | 150 (52) | 69 | 193 (66) | 29 (10%) |
| Anti-CD123 | 2gki:A | 1-293 | 3.62e−12 | 193 (66) | 158 (54) | 171 | 192 (65) | 39 (13%) |

TABLE 2

Compiled results of predictive structure for models 1 to 6 anti-CD33 RfuCAR in the softwares IntFold and RaptorX.

| | IntFold | | | | RaptorX | | | | | | | |
|---|---|---|---|---|---|---|---|---|---|---|---|---|
| Model | Templates Matched | Confidence p-value | Quality Score | Domains | Templates Matched | Position | p-value | uGDT (GDT) | uSeqId (SegId): | Score | Overall uGDT (GDT): | Disordered Positions (number/%) |
| 1 | 1bzhH, 4yfcB | MEDIUM 2.018e−2 | 0.3738 | 2 | 5dk3:B 3o4o:C | 1-476 477-843 | 3.13e−18 1.54e−13 | 305 (65) 68 (72) | 311 (65) 314 (84) | 294 220 | 572 (67) | 32 (3%) |
| 2 | 5yd5Am 3o4oC | CERT 8.724E−4 | 0.4465 | 2 | 3o4o:C 5lxaH 6ehyA 5aawA | 267-632 1-266 | 1.95e−13 3.15e−11 | 264 (72) 199 (75) | 314 (86) 150 (56) | 217 169 | 462 (73) | 21 (3%) |
| 3 | 1mcoH, 1hzhH 1r70B, 3o4oC | MEDIUM 1.413E−2 | 0.3814 | 2 | 5dk3:B 3o4o:C | 1-464 465-837 | 2.65e−18 1.72e−13 | 300 (65) 266 (71) | 302 (65) 314 (84) | 298 221 | 566 (67) | 33 (3%) |
| 4 | 1igtB, 3o4oC | HIGH 5.143E−3 | 0.4055 | 2 | 5dk3:B 3o4o:C | 1-476 465-837 | 5.01e−16 2.31e−13 | 306 (64) 262 (80) | 314 (66) 314 (66) | 293 220 | 567 (70) | 32 (3%) |
| 5 | 5yd5A, 3o4oC | 1.095E−3 | 0.4412 | 2 | 3o4o:C 5lxaH 6ehyA 5aawA | 267-587 1-266 | 3.27e−13 3.53e−11 | 261 (81) 196 (74) | 314 (98) 148 (56) | 220 167 | 466 (77) | 22 (3%) |
| 6 | 1igtD, 4yfcB | HIGH 5.677E−3 | 0.4032 | 2 | 5dk3:B 3o4o:C | 1-464 465-792 | 8.19e−18 2.58e−13 | 308 (66) 261 (80) | 302 (65) 314 (96) | 298 319 | 569 (71) | 32 (4%) |

Figure 7:
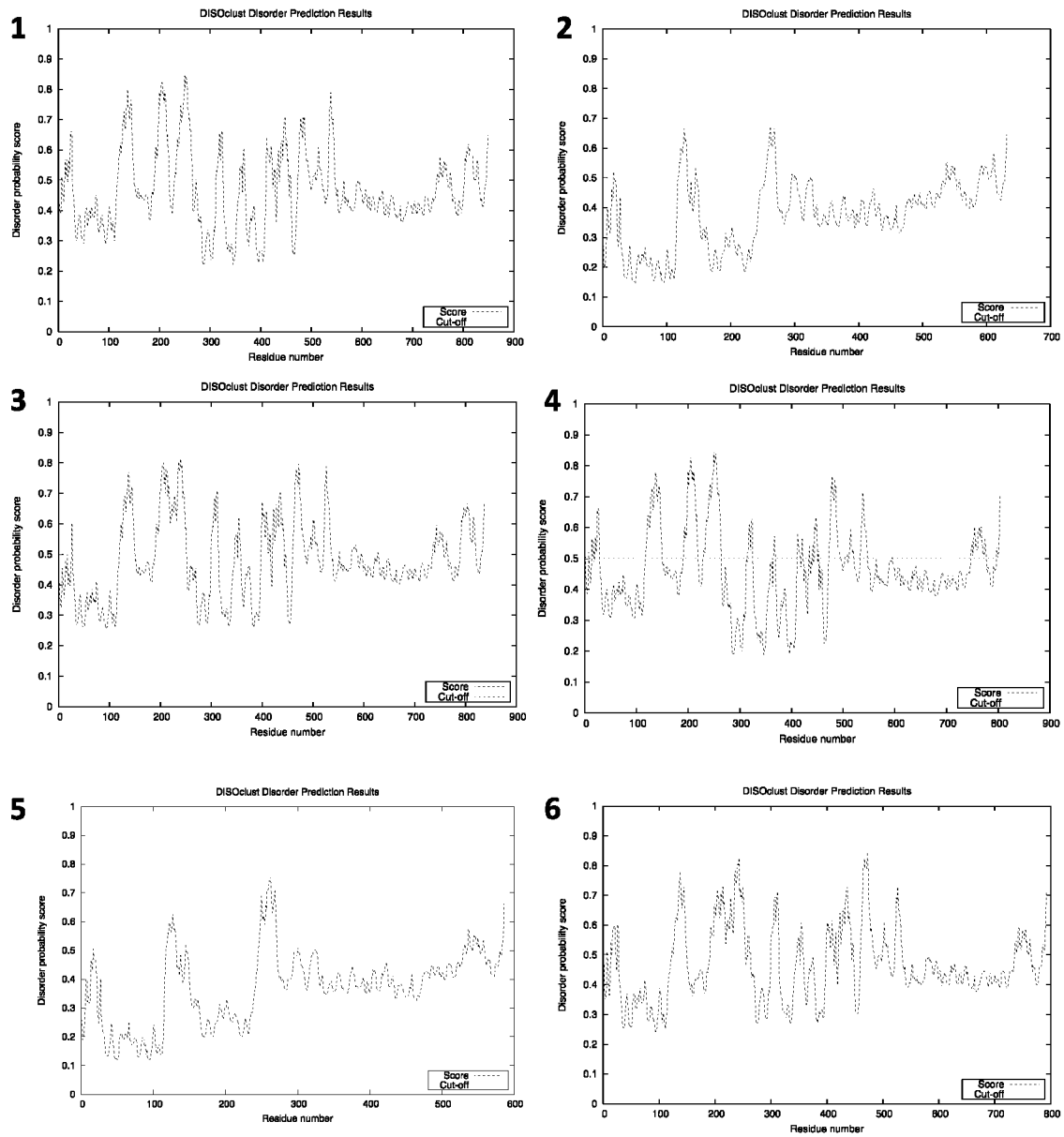
FIG. 7 presents the disorder plots for the prediction models of anti-CD33 RfuCAR. Each plot represents the disorder prediction for each model 1 to 6.

The model 2 has the best results of predicted structure in both softwares. The templates matched in the database are also more similar to the function expected for RfuCAR. Model 2 has matched to the structure of IL-1 receptor complex and also to an scFv motif (Table 3 reports all of the matched templates), indicating that probably the structure of the anti-CD33 and the IL-1R2 receptor are maintained in this model. The spacer applied in this model is only the Hinge of IgG4 but considering the percentage and regions of disorder (table 2, FIG. 7) it seems to allow the adequate mobility of the motifs. The most disordered regions, those regions without a regular secondary structure and more flexible, are in the IgG4 Hinge region and in the linker between the two chains on the scFv (anti-CD33) region. The other models present more disorder regions, that can indicate a less accurate predictive model or a protein with a tertiary structure that is not similar to the expected.

TABLE 3

Matched templates for all the predicted models of RfuCAR

| Template | Description |
| --- | --- |
| 3o4oC | Interleukin-1 receptor complex - C chain |
| 5dk3:B | IgG4 Antibody - B chain |
| 5lxaH | Adiponectin receptor 2 |
| 6ehyA | scFv AbVance (Generic scFv) - A chain |
| 6ehxB | B-chain |
| 5aawA | Structure of a redesigned cross-reactive antibody to dengue virus - A chain |
| 2qki:A | Heavy and light chain variable single domains of an anti-DNA binding antibody - A chain |
| 2gkiB | Bchain |
| 1hzhH | Human igg b12 - Heavy chain |
| 4yfcB | Interleukin-1 receptor accessory protein-like 1. Chain: b. |
| 5yd5A | scFv antibody 4b08 with epitope peptid - A chain |
| 2qhwB | Sars spike protein receptor binding domain in complex with a neutralizing antibody - B chain |
| 5b6fB | Fab fragment of an anti-leukotriene c4 monoclonal antibody - B chain |
| 1l6xA | Fc fragment of rituximab (anti-CD20) - A-chain |
| 3ay4A | Nonfucosylated fc complexed with bis-glycosylated soluble form of fc gamma receptor iiia - A chain |
| 4pp1D | der p 1 allergen complexed with fab fragment of mab 5h8 - D chain |
| 1igtD | Igg2a intact antibody - mab231. D chain |
| 1igtB | B chain |
| 1mcoH | Human immunoglobulin with a hinge deletion - Heavy Chain |
| 1r7OB | Human iga2 (m1) light chain - B-chain |

Figure 8:
FIG. 8 presents the predicted binding sites for RfuCAR model 2.

The predicted binding sites and locations for the Model 2 are positions: 50, 227, 228, 229; 272 and 360. Most likely ligands at each site (Type): ILE; FUL. Centroid ligands at each site (TypeID): SER657; FUL641. All ligands in clusters (Type-Frequency): GLY-1, TRP-1, GLU-2, ILE-3, PRO-3, SER-2, THR-2, TYR-3, ASP-1, LEU-1, ASN-1; FUL-1, FUC-1. Likely+centroid ligands at each site: ILE650; FUL641. The predicted binding sites are shown in the FIG. 8.

RfuCAR Anti-CD123

Figure 9:
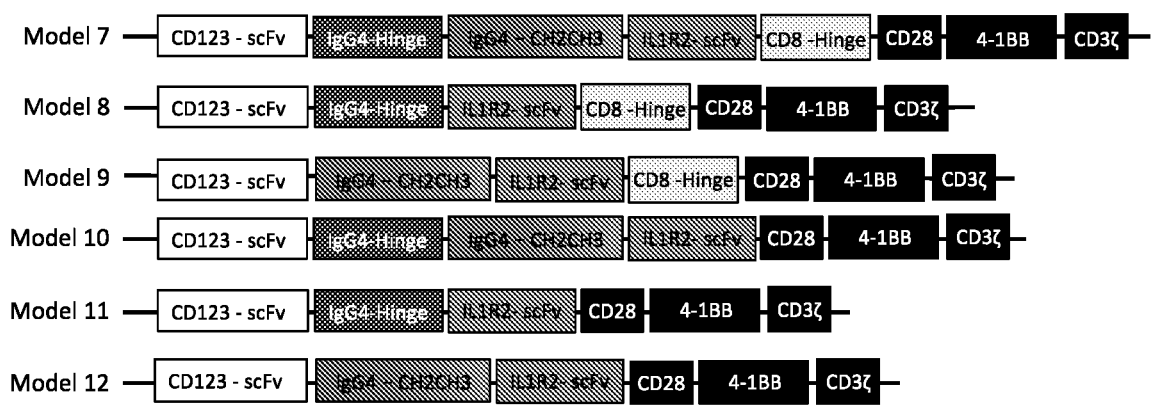
FIG. 9 presents the schematic view of putative anti-CD123 RfuCAR.

The tested models for RfuCAR anti-CD123 were described in the FIG. 9 and the sequences used are represented by SEQ. ID. Nos. 7 to 12. The schemes of colors are the same in the schematic view and in the sequences.

Figure 10:
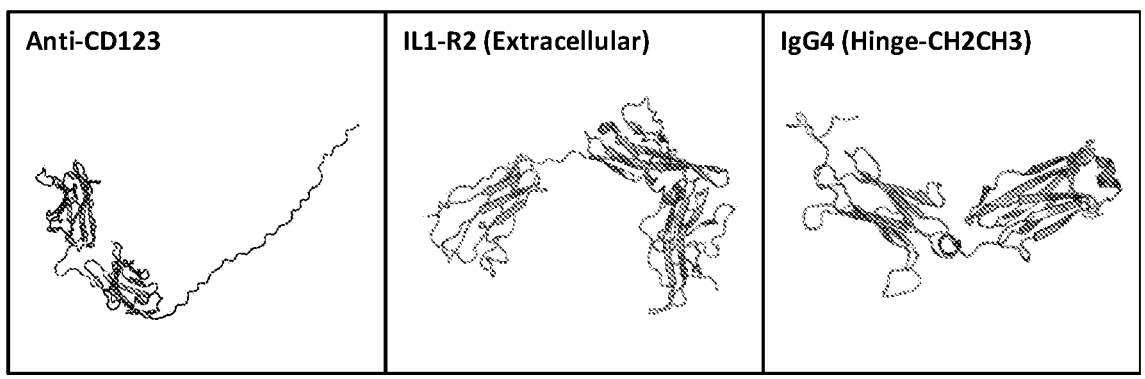
FIG. 10 presents the predictive structures (RaptorX) for Anti-CD123 scFv domain, IL1-R2 extracellular domain and IgG4 Hinge-CH2CH3 domains.
Figure 11:
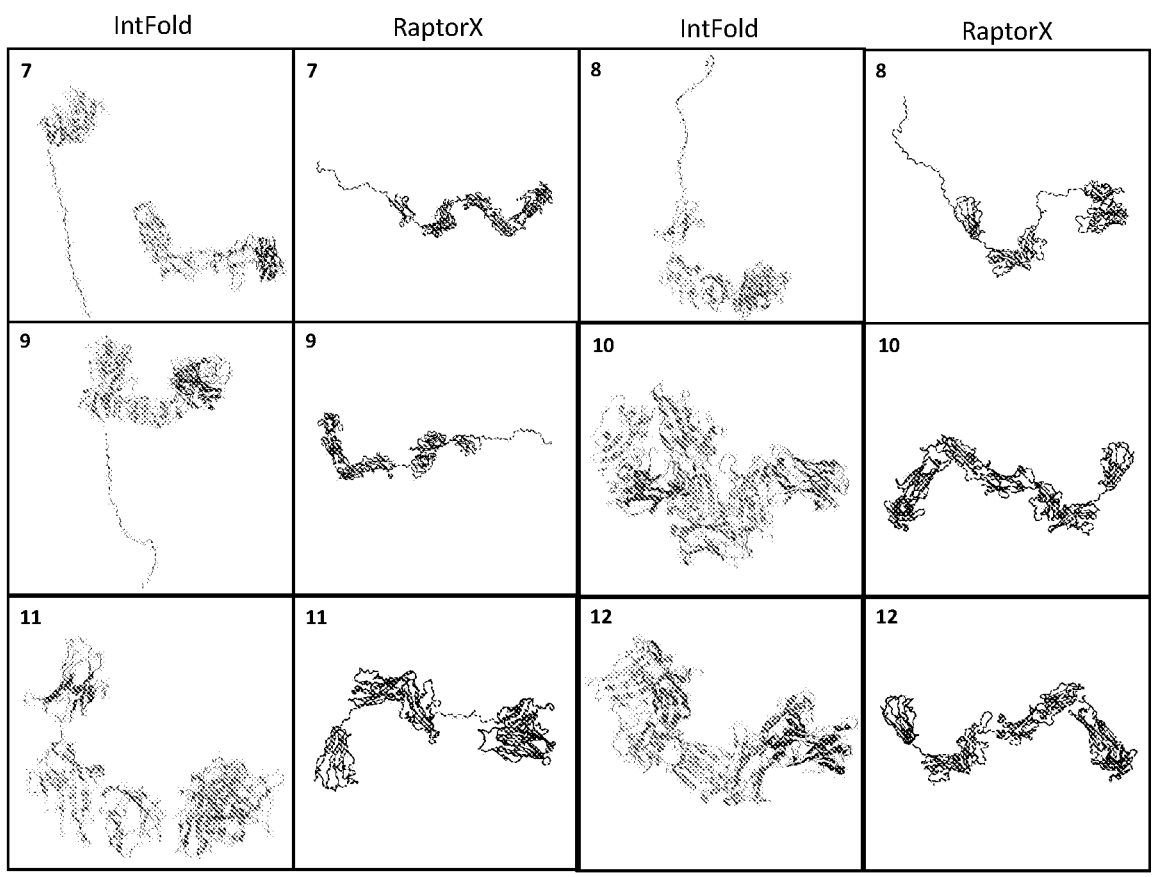
FIG. 11 presents the tridimensional models for the tested sequences of extracellular domain of anti-CD123 RfuCAR. The numbers in the boxes corresponds to the model number 7 to 12. Are shown the best matched model for each construction in the two softwares: IntFold and RaptorX.

The tested sequences generated the following tridimensional predictive structures for each domain alone (FIG. 10) and for the putative constructions (FIG. 11).

Figure 12:
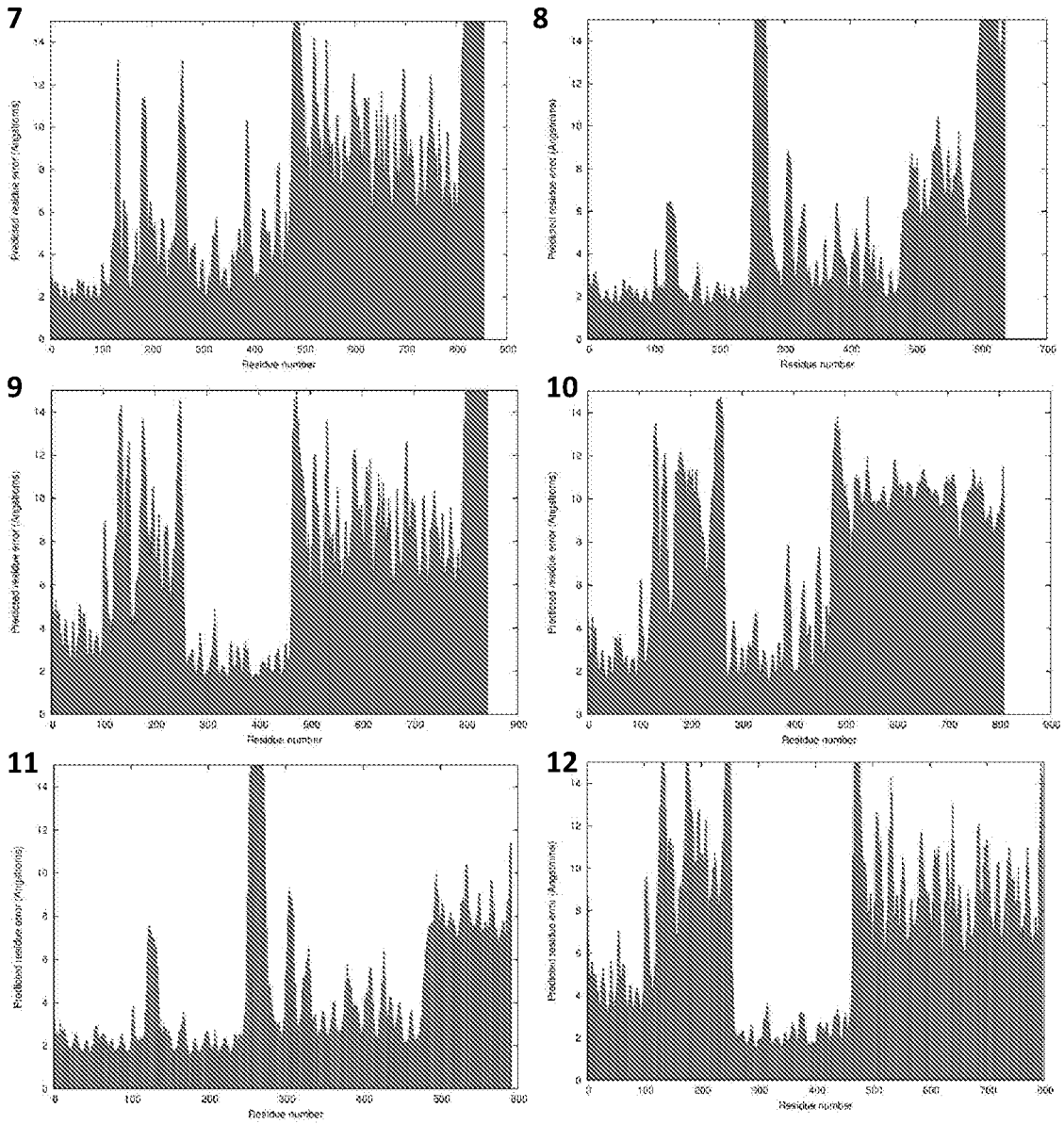
FIG. 12 presents the quality plots for all the best matches for each model for CD123-RfuCAP models (7-12)

Apparently, the structure of model 8 (represented by SEQ. ID. No. 8) is the one that maintains the adequate structure of the included components. It is corroborated by the technical data reported by each software compiled in the tables 1 (Domains alone) and 4 (Anti-CD123 RfuCAR models). This model has the second best quality score on IntFold analysis (0.4404). The model 8 quality score is minor than the model 11 and the quality plots have very similar distribution (FIG. 12). Despite this, model 8 maintains the CD8 hinge near the cells membrane as constructed for the anti-CD33 and anti-CD123 CAR-Ts, that have been already proven to be functional. The model 11 does not have the CD8 hinge region.

Figure 13:
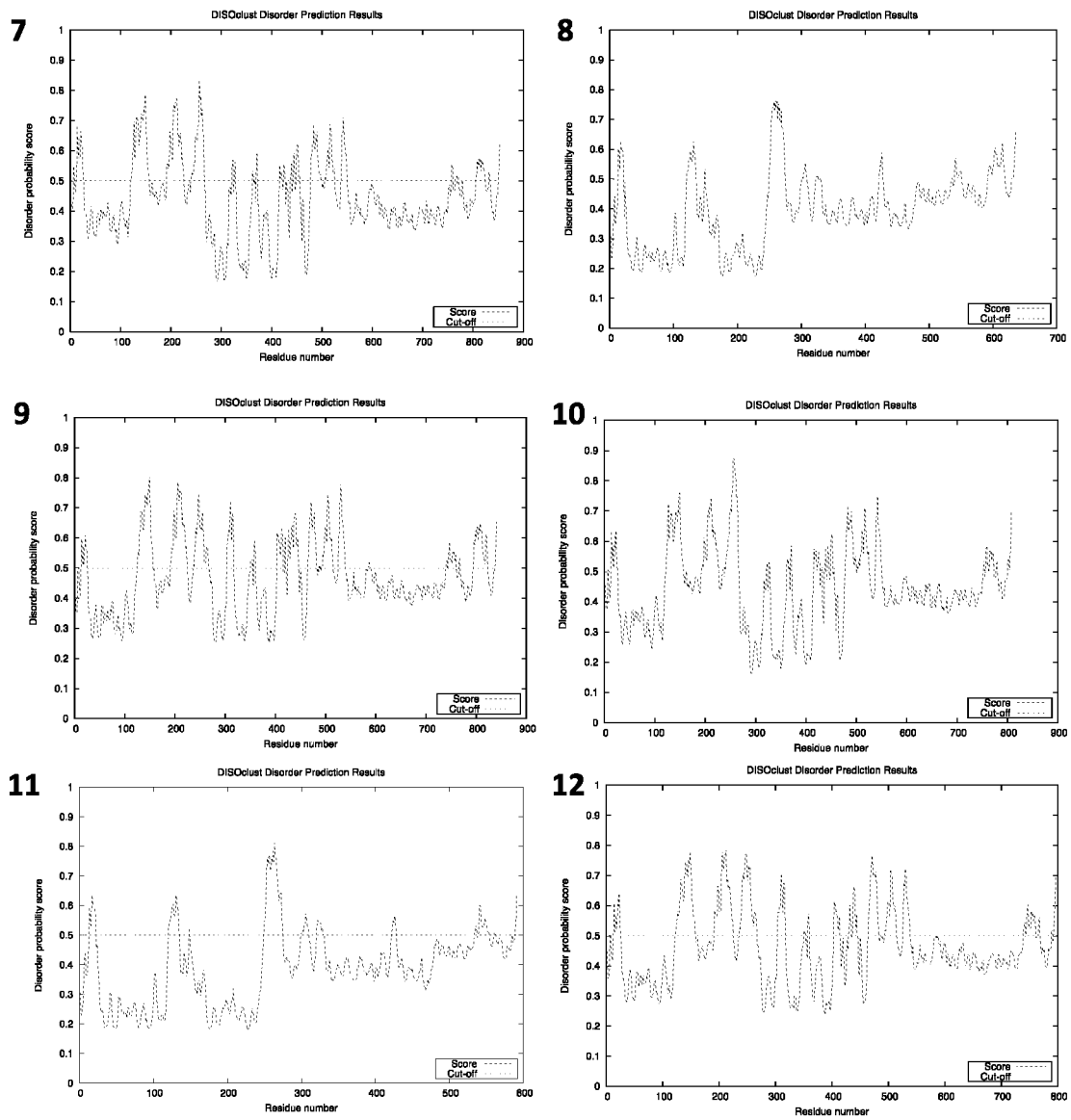
FIG. 13 presents the disorder plots for the prediction models of anti-CD123 RfuCAR. Each plot represents the disorder prediction for each model 7 to 12.

The model 8 has also one of the best results in RaptorX software. The templates matched in the database are more similar to the function expected for RfuCAR. Model 8 has matched to the structure of IL-1 receptor complex and also to an scFv motif (Table 3 reports all of the matched templates), indicating that probably the structure of the anti-CD123 and the IL-1R2 receptor are maintained in this model. The spacer applied in this model is only the Hinge of IgG4 but considering the percentage and regions of disorder (table 11, FIG. 13) it seems to allow the adequate mobility of the motifs. The most disordered regions, those regions without a regular secondary structure and more flexible, are in the IgG4 Hinge region and in the linker between the two chains on the scFv (anti-CD123) region. The models 7, 9, 10 and 12 have many highly disordered regions, indicating regions without good predictive fold.

TABLE 11

Compiled results of predictive structure for models 8 to 12 anti-CD123 RfuCAR in the softwares IntFold and RaptorX.

| | IntFold | | | | RaptorX | | | | | | Overall | Disordered Positions |
| --- | --- | --- | --- | --- | --- | --- | --- | --- | --- | --- | --- | --- |
| Model | Templates Matched | Confidence p-value | Quality Score | Domains | Templates Matched | Position | p-valve | uGDT (GDT) | uSeqId (SeqId) | Score | uGDT Score (GDT): | (number/ %) |
| 7 | 1hzhH, 4yfcB | MEDIUM 1.589E−2 | 0.3789 | 2 | 5dk3:B 3o4o:C | 1-480 451-853 | 1.09e−18 1.74e−13 | 317 (66) 260 (71) | 308 (64) 314 (84) | 305 220 | 581 (68) | 19 (2%) |
| 8 | 5yd5A, 2gkiB, 3o4oC, 2ghwB | HIGH 1.137E−3 | 0.4404 | 2 | 3o4o:C 6ehxB 5aawA | 271-636 1-270 | 1.05e−13 8.05e−12 | 266 (73) 183 (68) | 314 (86) 153 (57) | 223 170 | 448 (70) | 24 (3%) |
| 9 | 5b6fB, 1l6xA, 4yfcB | MEDIUM 1.808E−2 | 0.3762 | 2 | 5dk3:B 3o4o:C | 1-468 469-841 | 1.03e−18 1.51e−13 | 306 (66) 266 (71) | 295 (63) 314 (84) | 307 221 | 573 (68) | 24 (2%) |

TABLE 11-continued

Compiled results of predictive structure for models 8 to 12 anti-CD123 RfuCAR in the softwares IntFold and RaptorX.

| | IntFold | | | | RaptorX | | | | | | | |
|---|---|---|---|---|---|---|---|---|---|---|---|---|
| Model | Templates Matched | Confidence p-value | Quality Score | Do-mains | Templates Matched | Position | p-valve | uGDT (GDT) | uSeqId (SeqId): | Score | Overall uGDT (GDT): | Disordered Positions (number/ %) |
| 10 | 3ay4A, 4pp1D, 4yfcB | H1.116E-3 | 0.3849 | 2 | 5dk3:B 3o4o:C | 1-480 481-808 | 5.46e-19 1.27e-15 | 318 (66) 365 (81) | 307 (64) 314 (96) | 203 221 | 582 (72) | 23 (2%) |
| 11 | 5yd5A, 3o4oC, | 3.356E-4 | 0.4686 | 2 | 3o4o:C 6ehxB 5aawA | 271-591 1-270 | 1.55e-13 8.77e-12 | 263 (82) 187 (69) | 314 (98) 153 (57) | 221 168 | 450 (76) | 25 (4%) |
| 12 | 5b6fB, 3ay4A 4yfcB | H9.526E-3 | 0.3900 | 2 | 5dk3:B 3o4o:C | 1-468 469-796 | 1.70e-18 2.98e-13 | 309 (66) 263 (80) | 295 (63) 314 (96) | 303 315 | 571 (71) | 24 (3%) |

Figure 14:
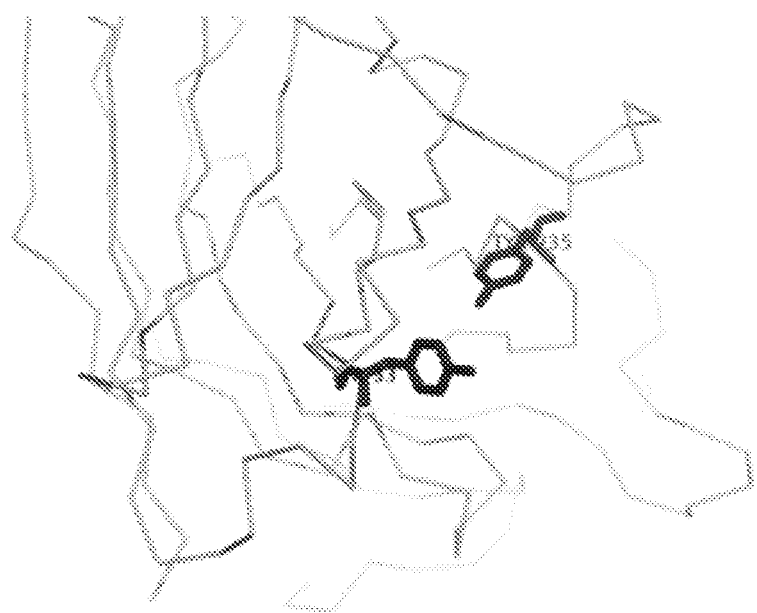
FIG. 14 presents the predicted binding sites for RfuCAR model 8.

The predicted binding sites and locations for the Model 8 are positions: 33, 235. Most likely ligands at each site (Type): TYR. Centroid ligands at each site (TypeID): PRO656. All ligands in clusters (Type-Frequency): GLY-3, TRP-2, GLU-2, ILE-3, PRO-4, SER-3, ARG-1, THR-2, TYR-5, ASP-1, LEU-1, ASN-4, ALA-2, CYS-1. Likely+ centroid ligands at each site: TYR672. The predicted binding sites are shown in the FIG. 14.

Therefore, according to the reported predictive structures the best choice of spacer, those which have the better chance to maintain in vivo the structure of the domains in RfuCAR are the model. 2 (SEQ. ID. No. 2) for anti-CD33 RfuCAR and model 8 (SEQ. ID. No. 8) for anti-CD123 RfuCAR. Both include the anti-tumoral scFv, the IL1-R2 receptor with IgG4 Hinge as a spacer between receptors and CD8 hinge as a spacer from cell membrane.

Although the invention has been amply described, it is obvious to those skilled in the art that various changes and modifications may be made to improve the design without such changes being outside the scope of the invention.

BIBLIOGRAPHIC REFERENCES

DINARELLO C A. Biologic Basis For Interleukin-1 In Disease. *Blood.* 1996; 87(6):2095-2147.
APTE R N, Voronov E. Interleukin-1-A Major Pleiotropic Cytokine In Tumor-Host Interactions. *Semin Cancer Biol.* 2002; 12(4):277-290. Doi:10.1016/S1044-579X(02) 00014-7.
DUNN E, Sims J E, Nicklin M J H, O'Neill L A J. Annotating Genes With Potential Roles In The Immune System: Six New Members Of The IL-1 Family. *Trends Immunol.* 2001; 22(10):533-536. Doi:10.1016/51471-4906(01)02034-8.
DINARELLO C, Arend W, Sims J, Smith D, Blumberg H, O'Neill. L. IL-1 Family Nomenclature. *Nat Immunol.* 2010; 11(11):973. Doi:10.1038/0by.2010.55.
WEBER A, Wasiliew P, Kracht M. Interleukin-1 (IL-1) Pathway. *Sci Signal.* 2010; 3(105). Doi:10.1126/ Scisignal.3105cm1.
AURON P E. The Interleukin 1 Receptor: Ligand Interactions And Signal. Transduction. *Cytokine Growth Factor Rev.* 1998; 9(3-4):221-237. Doi:10.1016/51359-6101(98) 00018-5.
VIDAL-VANACLOCHA F, Alvarez A, Asumendi A, Urcelay B, Tonino P, Dinarello C A. Interleukin 1 (IL-1)-Dependent Melanoma Hepatic Metastasis In Vivo; Increased Endothelial Adherence By IL-1-Induced Mannose Receptors And Growth Factor Production In Vitro. *J Natl Cancer Inst.* 1996; 88(3-4):198-205. Doi:10.1093/ Jnci/88.3-4.198.
COXON A, Bolon B, Estrada J, Et Al. Inhibition Of Interleukin-1 But Not Tumor Necrosis Factor Suppresses Neovascularization In Rat Models Of Corneal Angiogeniesis And Adjuvant Arthritis. *Arthritis Rheum.* 2002; 46(10):2604-2612. Doi:10.1002/Art.10546.
VORONOV E, Shouval D S, Krelin Y, Et Al. IL-1 Is Required For Tumor Invasiveness And Angiogenesis. *Proc Natl Acad Sci.* 2003; 100(5):2645-2650. Doi: 10.1073/Pnas.0437939100.
SONG X, Voronov E, Dvorkin T, Et Al. Differential Effects Of IL-1 And IL-1 On Tumorigenicity Patterns And Invasiveness. *J Immunol.* 2003; 171(12):6448-6456. Doi: 10.4049/Jimmunol.171.12.6448.
CAREY A, Edwards D K, Eide C A, Et Al. Identification Of Interleukin-1 By Functional Screening As A Key Mediator Of Cellular Expansion And Disease Progression In Acute Myeloid Leukemia. *Cell Rep.* 2017; 18(13):3204-3218. Doi:10.1016/J.Celrep.2017.03.018.
BONECCHI R, Garlanda C, Mantovani A, Riva F. Cytokine Decoy And Scavenger Receptors As Key Regulators Of Immunity And Inflammation. *Cytokine.* 2016; 87:37-45. Doi:10.1016/J.Cyto.2016.06.023.
NORELLI M, Camisa B, Barbiera G, Et Al. Monocyte-Derived IL-1 And IL-6 Are Differentially Required For Cytokine-Release Syndrome And Neurotoxicity Due To CAR T Cells. *Nat Med.* May 2018:1. Doi:10.1038/ 541591-018-0036-4.
GIAVRIDIS T, Van Der Stegen S J C, Eyquem J, Hamieh M, Piersigilli A, Sadelain M. CAR T Cell-Induced Cytokine Release Syndrome Is Mediated By Macrophages And Abated By IL-1 Blockade. *Nat Med.* 2018:1. Doi: 10.1038/541591-018-0041-7.
TARASEVICIUTE A, Tkachev V, Ponce R, Et Al. Chimeric Antigen Receptor T Cell-Mediated Neurotoxicity In Nonhuman Primates. *Cancer Discov.* March 2018:CD-17-1368. Doi:10.1158/2159-8290.CD-17-1368.
LUST J A, Lacy M Q, Zeldenrust S R, Et Al. Induction Of A Chronic Disease State In Patients With Smoldering Or Indolent Multiple Myeloma By Targeting Interleukin 1R-Induced Interleukin 6 Production And The Myeloma Proliferative Component. *Mayo Clin Proc.* 2009; 84(2): 114-122. Doi: 10.4065/84.2.114.

HALLEGUA D S. Potential Therapeutic Uses Of Interleukin 1 Receptor Antagonists In Human Diseases. *Ann Rheum Dis.* 2002; 61 (11):960-967. Doi:10.1136/Ard.61.11.960.

DINARELLO C A. Why Not Treat Human Cancer With Interleukin-1 Blockade? *Cancer Metastasis Rev.* 2010; 29(2):317-329. Doi:10.1007/510555-010-9229-0.

DINARELLO C A, Thompson P C. Blocking IL-1: Interleukin 1 Receptor Antagonist In Vivo And In Vitro. *Immunol Today.* 1991; 12(11):404-410. Doi:10.1016/0167-5699(91) 90142-G.

MANTOVANI A, MUZIO M, GHEZZI P, COLOTTA C, INTRONA M. Regulation Of Inhibitory Pathways Of The Interleukin-1 System. *Ann N Y Acad Sci.* 1998; 840(1): 338-351. Doi:10.1.111/J.1749-6632.1998.Tb09573.X.

COLOTTA F, Re F, Muzio M, Et Al. Interleukin-1 Type II Receptor: A Decoy Target For IL-1 That is Regulated By IL-4. *Science* (80-). 1993; 261(5120):472-475. Doi: 10.1126/Science.8332913.

MCMAHAN C J, Slack J L, Mosley B, Et Al. A Novel IL-1 Receptor, Cloned From B Cells By Mammalian Expression, is Expressed In Many Cell Types. *EMBO J.* 1991; 10(10):2821-2832. Http://Www.Pubmedcentral.Nih.Gov/Articerender.Fcgi?Artid=452 992&Tool=Pmcentrez&Rendertype=Abstract.

THOMAS C, Bazan J F, Garcia K C. Structure Of The Activating IL-1 Receptor Signaling Complex. 2014; 19(4):455-457. Doi:10.1038/Nsmb.2260.Structure.

SYMONS J A, Young P R, Duff G W. Soluble Type-II Interleukin-1 (Il-1) Receptor Binds And Blocks Processing Of Il-1-Beta Precursor And Loses Affinity For Il-1 Receptor Antagonist. *Proc Natl Acad Sci USA.* 1995; 92(5):1714-1718. Doi:DOI 10.1073/Pnas.92.5.1714.

BOURKE E, Cassetti A, Villa A, Fadlon E, Colotta F, Mantovani A. IL-1 Scavenging By The Type II IL-1 Decoy Receptor In Human Neutrophils. *J Immunol.* 2003; 170 (12):5999-6005. Doi:10.4049/Jimmunol.170.12.5999.

RE F, Muzio M, De Rossi M, Et Al. The Type II "Receptor" As A Decoy Target For Interleukin 1 In Polymorphonuclear Leukocytes: Characterization Of Induction By Dexamethasone And Ligand Binding Properties Of The Released Decoy Receptor. *J Exp Med.* 1994; 179(2):739-743. Doi:10.1084/Jem.179.2.739.

RAUSCHMAYR T, Groves R W, Kupper T S. Keratinocyte Expression Of The Type 2 Interleukin 1 Receptor Mediates Local And Specific Inhibition Of Interleukin 1-Mediated Inflammation. *Med Sci.* 1997; 94(May):5814-5819.

BESSIS N, Guery L, Mantovani A, Et Al. The Type II Decoy Receptor Of IL-1 Inhibits Murine Collagen-Induced Arthritis. *Eur J Immunol.* 2000; 30(3):867-875. Doi: 10.1002/1521-4141(200003)30:3<867::AID-IMMU867>3.0.00; 2-M.

DAWSON J, Engelhardt P, Kastelic T, Cheneval D, Mackenzie A, Ramage P. Effects Of Soluble Interleukin-1 Type II Receptor On Rabbit Antigen-Induced Arthritis: Clinical, Biochemical And Histological Assessment. *Rheumatology (Oxford).* 1999; 38(5):401-406. Http://Www.Ncbi.Nlm.Nih.Gov/Pubmed/10371276.

ATTUR M G, Dave M, Cipolletta C, Et Al. Reversal Of Autocrine And Paracrine Effects Of Interleukin 1 (IL-1) In Human Arthritis By Type II IL-1 Decoy Receptor. Potential For Pharmacological Intervention. *J Biol Chem.* 2000; 275(51):40307-40315. Doi:10.1074/Jbc.M002721200.

KHOUFACHE K, Bondza P K, Harir N, Et Al. Soluble Human IL-1 Receptor Type 2 Inhibits Ectopic Endometrial Tissue Implantation And Growth: Identification Of A Novel Potential Target For Endometriosis Treatment. *Am J Pathol.* 2012; 181 (4):1197-1205. Doi:10.101.6/J.Ajpath.2012.06.022.

BELLEHUMEUR C, Collette T, Maheux R, Mailloux J, Villeneuve M, Akoum A. Increased Soluble interleukin-1 Receptor Type II Proteolysis In The Endometrium Of Women With Endometriosis. *Hum Reprod* 2005; 20 (5): 0.1177-1184. Doi:10.1093/Humrep/Deh749.

GUAY S, Akoum A. Stable Inhibition Of Interleukin 1 Receptor Type II In Ishikawa Cells Augments Secretion Of Matrix Metalloproteinases: Possible Role In Endometriosis Pathophysiology. *Reproduction.* 2007; 134(3): 525-534. Doi:10.1530/REP-06-0377.

SIMEONI E, Dudler J, Fleury S, Et Al. Gene Transfer Of A Soluble IL-1 Type 2 Receptor-Ig Fusion Protein Improves Cardiac Allograft Survival In Rats. *Eur J Cardiothorac Surg.* 2007; 31(2):222-228. Doi:10.1016/J.Ejcts.2006.10.042.

CHANG H, Wang Y, Wu W, Li G, Hanawa H, Zou J. Hydrodynamics-Based Delivery Of An Interleukin-1 Receptor II Fusion Gene Ameliorates Rat Autoimmune Myocarditis By Inhibiting IL-1 And Th17 Cell Polarization. *Int J Mol Med.* 2013; 31 (4):833-840. Doi:10.3892/Tjmm.2013.1276.

BOSSU P, Visconti U, Ruggiero P, Et Al. Transfected Type II Interleukin-1 Receptor Impairs Responsiveness Of Human Keratinocytes To Interleukin-1. *Am J Pathol.* 1.995; 147 (6):1852-1861. Http://Www.Pubmedcentral.Nih.Gov/Articlerender.Fcgi?Artid=1 869949&Tool=Pmcentrez&Rendertype=Abstract.

MAR A C, Chu C H, Lee H J, Et Al. Interleukin-1 Receptor Type 2 Acts With C-Fos To Enhance The Expression Of Interleukin-6 And Vascular Endothelial Growth Factor A In Colon Cancer Cells And Induce Angiogenesis. *J Biol Chem.* 2015; 290(36):22212-22224. Doi:10.1074/Jbc.M115.644823.

CHMIELEWSKI M, Hombach A A, Abken H. Antigen-Specific T-Cell Activation Independently Of The MHC: Chimeric Antigen Receptor-Redirected T Cells. *Front Immunol.* 2013; 4 (November):1-7. Doi:10.3389/Fimmu.2013.00371.

HUDECEK M, Sommermeyer D, Kosasih P L, Et Al. The Nonsignaling Extracellular Spacer Domain Of Chimeric Antigen Receptors Is Decisive For In Vivo Antitumor Activity. *Cancer Immunol Res.* 2015; 3 (2):125-135. Doi:10.1158/2326-6066.CIR-14-0127.

GRADA Z, Hegde M, Byrd T, Et Al. Tancar: A Novel Bispecific Chimeric Antigen Receptor For Cancer Immunotherapy. *Mol Ther—Nucleic Acids.* 2013; 2(April): E105. Doi:10.1038/Mtna.2013.32.

HEGDE M, Mukherjee M, Grada Z, Et Al. Tandem CAR T Cells Targeting HER2 And IL13R A 2 Mitigate Tumor Antigen Escape. *J Clin Invest.* 2016; 126(8):3036-3052. Doi:10.1172/JCI83416.We.

WATANABE N, Bajgain P, Sukunaran S, Et Al. Fine-Tuning The CAR Spacer Improves T-Cell Potency. *Oncoimmunology.* 2016; 5(12):E1253656. Doi:10.1080/2162402X.2016.1253656.

NORELLI M, Casucci M, Bonini C, Bondanza A. Clinical Pharmacology Of CAR-T Cells: Linking Cellular Pharmacodynamics To Pharmacokinetics And Antitumor Effects. *Biochim Biophys Acta—Rev Cancer.* 2016; 1865 (1):90-100. Doi:10.1016/J.Bbcan.2015.12.001.

ROMBACH A, Heuser C, Gerken M, Et Al. T Cell Activation By Recombinant FcEri 1λ-Chain Immune Receptors: An Extracellular Spacer Domain Impairs Antigen-Dependent T Cell. Activation But Not Antigen Recognition. *Gene Ther.* 2000; 7(12):1067-1075. Doi:10.1038/Sj.Gt.3301195.

GUEST R D, Hawkins R E, Kirillova N, Et Al. The Role Of Extracellular Spacer Regions In The Optimal. Design Of Chimeric Immune Receptors. *J Immunother.* 2005; 28(3): 203-211. Doi:10.1097/01.Cji.0000161397.96582.59.

JAMES S E, Greenberg P D, Jensen M C, Et Al. Antigen Sensitivity Of CD22-Specific Chimeric TCR Is Modulated By Target Epitope Distance From The Cell Membrane. *J Immunol.* 2008; 180(10):7028-7038. Doi: 10.4049/Jimmunol.180.10.7028.

DAVIS S J, Van Der Merwe P A. The Kinetic-Segregation Model: TCR Triggering And Beyond. *Nat Immunol.* 2006; 7(8):803-809. Doi:10.1038/Ni 1369.

PORTER D L, Levine B L, Kalos M, Bagg A, June C H. Chimeric Antigen Receptor-Modified T Cells In Chronic Lymphoid Leukemia. *N Engl J Med.* 2011; 365(8):725-733. Doi:10.1056/Nejmoa1103849.

KALOS M, Levine B L, Porter D L, Et Al. T Cells With Chimeric Antigen Receptors Have Potent Antitumor Effects And Can Establish Memory In Patients With Advanced Leukemia. *Sci Transl Med.* 2011; 3(95): 95ra73-95ra73. Doi:10.1126/Scitranslmed.3002842.

SAVOLDO B, Ramos C A, Liu E, Et Al. CD28 Costimulation Improves Expansion And Persistence Of Chimeric Antigen Receptor-Modified T Cells In Lymphoma Patients. *J Clin Invest.* 2011; 121(5):1822-1826. Doi: 10.1172/JCI46110.

REN-HEIDENREICH L, Hayman G T, Trevor K T. Specific Targeting Of EGP-2+Tumor Cells By Primary Lymphocytes Modified With Chimeric T Cell Receptors. *Hum Gene Ther.* 2000; 11(1):9-19. Doi:10.1089/10430340050016111.

MORITZ D, Groner B. A Spacer Region Between The Single Chain Antibody- And The CD3 Zeta-Chain Domain Of Chimeric T Cell Receptor Components Is Required For Efficient Ligand Binding And Signaling Activity. *Gene Ther.* 1995; 2 (8):539546. Http://Www.Ncbi.Nlm.Nih.Gov/Pubmed/8593604.

PATEL S D, Moskalenko M, Smith D, Maske B, Finer M H, Mcarthur J G. Impact Of Chimeric Immune Receptor Extracellular Protein Domains On T Cell Function. *Gene Ther.* 1999:6(3):412-419. Doi:10.1038/SJ.Gt.3300831.

HAWKINS R E, Ed. *Cellular Therapy Of Cancer: Development Of Gene Therapy Based Approaches.* World Scientific; 2014.

MATSUSHIMA N, Yoshida H, Kumaki Y, Et Al. Flexible Structures And Ligand Interactions Of Tandem Repeats Consisting Of Proline, Glycine, Asparagine, Serine, And/Or Threonine Rich Oligopeptides In Proteins. *Curr Protein Pept Sci.* 2008; 9(6):591-610. Doi:10.2174/138920308786733886.

VIDARSSON G, Dekkers G, Rispens T. Igg Subclasses And Allotypes: From Structure To Effector Functions. *Front Immunol.* 2014; 5(October):1-17. Doi:10.3389/Fimmu.2014.00520.

ALMASBAK H, Walseng E, Kristian A, Et Al. Inclusion Of An Igg1-Fc Spacer Abrogates Efficacy Of CD19 CAR T Cells In A Xenograft Mouse Model. *Gene Ther.* 2015; 22(5):391-403. Doi:10.1038/Gt.2015.4.

ANURATHAPAN U, Chan R C, Hindi H F, Et Al. Kinetics Of Tumor Destruction By Chimeric Antigen Receptor-Modified T Cells. *Mol Ther.* 2014; 22(3):623-633. Doi: 10.1038/Mt.2013.262.

CASUCCI M, Falcone L, Camisa B, Bonini C, Bondanza A. CAR Spacers Including NGFR Domains Allow Efficient T-Cell Tracking And Mediate Superior Antitumor Effects. *Mol Ther.* 2015; 23 (May):S163-S164. Doi:10.1016/S1525-0016 (16) 34023-0.

CASUCCI M, Falcone L, Camisa B, Et Al. Extracellular NGFR Spacers Allow Efficient Tracking And Enrichment Of Fully Functional CAR-T Cells Co-Expressing A Suicide Gene. *Front Immunol* 2018; 9 (March). Doi: 10.3389/Fimmu.2018.00507.

WANG G, De Jong R N, Van Den Bremer E T J, Et Al. Molecular Basis Of Assembly And Activation Of Complement Component Cl in Complex With immunoglobulin G1 And Antigen. *Mol Cell.* 2016; 63(1):135-145. Doi:10.1016/J.Molce1.2016.05.016.

AALBERSE R C, Schuurman J. Igg4 Breaking The Rules. *Immunology.* 2002; 105(1):9-19. Doi:10.1046/J. 0019-2805.2001.01341.X.

QIN L, Lai Y, Zhao R, Et Al. Incorporation Of A Hinge Domain Improves The Expansion Of Chimeric Antigen Receptor T Cells. *J Hematol Oncol.* 2017; 10(1):68. Doi:10.1186/513045-017-0437-8.

JONNALAGADDA M, Mardiros A, Urak R, Et Al. Chimeric Antigen Receptors With Mutated Igg4 Fc Spacer Avoid Fc Receptor Binding And Improve T Cell Persistence And Antitumor Efficacy. *Mol Ther.* 2015; 23(4):757-768. Doi:10.1038/Mt.2014.208.

MONTANO R F, Morrison S L. Influence Of The Isotype Of The Light. Chain On The Properties Of Igg. *J Immunol.* 2002; 168(1):224-231. Doi:10.4049/JImmuno1.168.1.224.

DORAI H, Wesolowski J S, Gillies S D. Role Of Inter-Heavy And Light Chain Disulfide Bonds In The Effector Functions Of Human Immunoglobulin Igg1. *Mol Immunol.* 1992; 29(12):1487-1491. Doi:10.1016/0161-5890 (92)90222-J.

ALABANZA L, Pegues M, Geldres C, Et Al. Function Of Novel Anti-CD19 Chimeric Antigen Receptors With Human Variable Regions Is Affected By Hinge And Transmembrane Domains. *Mol Ther.* 2017; 25(11):2452-2465. Doi:10.1016/J.Ymthe.2017.07.013.

JENA B, Dotti G, Cooper L J N. Redirecting T-Cell Specificity By Introducing A Tumor-Specific Chimeric Antigen Receptor. *Blood.* 2010; 116 (7):1035-1044. Doi: 10.1182/Blood-2010-01-043:37.

KENDERIAN S S, Ruella M, Shestova O, Et Al. CD33-Specific Chimeric Antigen Receptor T Cells Exhibit Potent Preclinical Activity Against Human Acute Myeloid Leukemia. *Leukemia.* 2015; 29(8):1637-1647. Doi: 10.1038/Leu.2015.52.

MARDIROS A, Forman S J, Budde L E. T Cells Expressing CD123 Chimeric Antigen Receptors For Treatment Of Acute Myeloid Leukemia. *Curr Opin Hematol.* 2015. Doi:10.1097/MOH.0000000000000190.

THOKALA R, Olivares S, Mi T, Et Al. Redirecting Specificity Of T Cells Using The Sleeping Beauty System To Express Chimeric Antigen Receptors By Mix-And-Matching Of VL And VH Domains Targeting CD123+Tumors. Unutmaz D, Ed. *Plos One.* 2016; 11(8):E0159477. Doi: 10.1371/Journal. Pone. 0159477.

LABORDA E, Mazagova M, Shao S, Et Al. Development Of A Chimeric Antigen Receptor Targeting C-Type Lectin-Like Molecule-1 For Human Acute Myeloid Leukemia. *Int J Mob Sci.* 201.7; 18 (11):2259. Doi:10.3390/Ijms18112259.

KENDERIAN S S, Porter D L, Gill S. Chimeric Antigen Receptor T Cells And Hematopoietic Cell Transplantation: How Not To Put The CART Before The Horse. *Biol Blood Marrow Transplant.* 2017; 23(2):235-246. Doi: 10.1016/J.Bbmt.2016.09.002.

MCGUFFIN L, Roche D B. Rapid Model Quality Assessment For Protein Structure Predictions Using The Comparison Of Multiple Models Without. Structural Alignments. *Bioinformatics.* 2010; 26(2):182-188. Doi: 10.1093/Bioinformatics/Btp629.

MCGUFFIN L J, Shuid A N, Kempster R, Et Al. Accurate Template-Based Modeling In CASP12 Using The Intfold4-TS, Modfold6, And Refold Methods. *Proteins Struct Funct Bioinforma.* 2018; 86:335-344. Doi:10.1002/Prot. 25360.

MCGUFFIN L J, Atkins J D, Salehe B R, Shuid A N, Roche D E. Intfold: An Integrated Server For Modelling Protein Structures And Functions From Amino Acid Sequences: FIG. 1. *Nucleic Acids Res.* 2015; 43(W1):W169-W173. Doi:10.1093/Nar/Gkv236.

BUENAVISTA M T, Roche D B, Mcguffin L J. Improvement Of 3D Protein Models Using Multiple Templates Guided By Single-Template Model Quality Assessment. *Bioinformatics.* 2012; 28 (14):1851-1857. Doi:10.1093/Bioinformatics/Bts292.

ROCHE D B, Buenavista M T, Mcguffin L J. Funfoldga: A Quality Assessment Tool For Protein-Ligand Binding Site Residue Predictions. Kurgan L, Ed. *Plos One.* 2012; 7(5):E38219. Doi:10.1371/Journal.Pone.0038219.

KALLBERG M, Wang H, Wang S, Et Al. Template-Based Protein Structure Modeling Using The Raptorx Web Server. *Nat Protoc.* 2012; 7:1511. Http://Dx.Doi.Org/10.1038/Nprot.2012.085.

MA J, Peng J, Wang S, Xu J. A Conditional Neural Fields Model For Protein Threading. *Bioinformatics.* 2012; 28(12):159-166. Doi:10.1093/Bioinformatics/Bts213.

PENG J, Xu J. A Multiple-Template Approach To Protein Threading. *Proteins Struct Funct Bioinforma.* 2011; 79(6):1930-1939. Doi:10.1002/Prot.23016.

PENG J, Xu J. Raptorx: Exploiting Structure Information For Protein Alignment By Statistical Inference. *Proteins Struct Funct Bioinforma.* 2011; 79(S10):161-171. Doi: 10.1002/Prot.23175.

M A J, Wang S, Zhao F, Xu J. Protein Threading Using Context-Specific Alignment Potential. *Bioinformatics.* 2013; 29(13):1257-1265. Doi:10.1093/Bioinformatics/Btt210.

The invention claimed is:

1. A bispecific in tandem chimeric antigen receptor (CAR) comprising SEQ ID NO:2.

\* \* \* \* \*

SEQUENCE LISTING

```
<160> NUMBER OF SEQ ID NOS: 30

<210> SEQ ID NO 1
<211> LENGTH: 849
<212> TYPE: PRT
<213> ORGANISM: Artificial
<220> FEATURE:
<223> OTHER INFORMATION: Model 1 AntiCD33  IgG4 (HingeCH2CH3)  IL1R2
      (extracellular)  CD8 (Hinge)

<400> SEQUENCE: 1

Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Gly Ser Gly Gly Gly Gly Ser Gly Gly
        115                 120                 125

Gly Gly Ser Asp Ile Gln Leu Thr Gln Ser Pro Ser Thr Leu Ser Ala
    130                 135                 140

Ser Val Gly Asp Arg Val Thr Ile Thr Cys Arg Ala Ser Glu Ser Leu
145                 150                 155                 160

Asp Asn Tyr Gly Ile Arg Phe Leu Thr Trp Phe Gln Gln Lys Pro Gly
                165                 170                 175

Lys Ala Pro Lys Leu Leu Met Tyr Ala Ala Ser Asn Gln Gly Ser Gly
```

```
                180                 185                 190
Val Pro Ser Arg Phe Ser Gly Ser Gly Ser Gly Thr Glu Phe Thr Leu
            195                 200                 205
Thr Ile Ser Ser Leu Gln Pro Asp Phe Ala Thr Tyr Tyr Cys Gln
        210                 215                 220
Gln Thr Lys Glu Val Pro Trp Ser Phe Gly Gln Gly Thr Lys Val Glu
225                 230                 235                 240
Val Lys Arg Thr Val Glu Ser Lys Tyr Gly Pro Pro Cys Pro Ser Cys
                245                 250                 255
Pro Ala Pro Glu Phe Leu Gly Gly Pro Ser Val Phe Leu Phe Pro Pro
            260                 265                 270
Lys Pro Lys Asp Thr Leu Met Ile Ser Arg Thr Pro Glu Val Thr Cys
        275                 280                 285
Val Val Val Asp Val Ser Gln Glu Asp Pro Glu Val Gln Phe Asn Trp
        290                 295                 300
Tyr Val Asp Gly Val Glu Val His Asn Ala Lys Thr Lys Pro Arg Glu
305                 310                 315                 320
Glu Gln Phe Asn Ser Thr Tyr Arg Val Val Ser Val Leu Thr Val Leu
                325                 330                 335
His Gln Asp Trp Leu Asn Gly Lys Glu Tyr Lys Cys Lys Val Ser Asn
            340                 345                 350
Lys Gly Leu Pro Ser Ser Ile Glu Lys Thr Ile Ser Lys Ala Lys Gly
        355                 360                 365
Gln Pro Arg Glu Pro Gln Val Tyr Thr Leu Pro Pro Ser Gln Glu Glu
        370                 375                 380
Met Thr Lys Asn Gln Val Ser Leu Thr Cys Leu Val Lys Gly Phe Tyr
385                 390                 395                 400
Pro Ser Asp Ile Ala Val Glu Trp Glu Ser Asn Gly Gln Pro Glu Asn
                405                 410                 415
Asn Tyr Lys Thr Thr Pro Pro Val Leu Asp Ser Asp Gly Ser Phe Phe
            420                 425                 430
Leu Tyr Ser Arg Leu Thr Val Asp Lys Ser Arg Trp Gln Glu Gly Asn
        435                 440                 445
Val Phe Ser Cys Ser Val Met His Glu Ala Leu His Asn His Tyr Thr
        450                 455                 460
Gln Lys Ser Leu Ser Leu Ser Leu Gly Lys Phe Thr Leu Gln Pro Ala
465                 470                 475                 480
Ala His Thr Gly Ala Ala Arg Ser Cys Arg Phe Arg Gly Arg His Tyr
                485                 490                 495
Lys Arg Glu Phe Arg Leu Glu Gly Glu Pro Val Ala Leu Arg Cys Pro
            500                 505                 510
Gln Val Pro Tyr Trp Leu Trp Ala Ser Val Ser Pro Arg Ile Asn Leu
        515                 520                 525
Thr Trp His Lys Asn Asp Ser Ala Arg Thr Val Pro Gly Glu Glu Glu
        530                 535                 540
Thr Arg Met Trp Ala Gln Asp Gly Ala Leu Trp Leu Leu Pro Ala Leu
545                 550                 555                 560
Gln Glu Asp Ser Gly Thr Tyr Val Cys Thr Thr Arg Asn Ala Ser Tyr
                565                 570                 575
Cys Asp Lys Met Ser Ile Glu Leu Arg Val Phe Glu Asn Thr Asp Ala
            580                 585                 590
Phe Leu Pro Phe Ile Ser Tyr Pro Gln Ile Leu Thr Leu Ser Thr Ser
        595                 600                 605
```

```
Gly Val Leu Val Cys Pro Asp Leu Ser Glu Phe Thr Arg Asp Lys Thr
            610                 615                 620

Asp Val Lys Ile Gln Trp Tyr Lys Asp Ser Leu Leu Asp Lys Asp
625                 630                 635                 640

Asn Glu Lys Phe Leu Ser Val Arg Gly Thr Thr His Leu Leu Val His
                645                 650                 655

Asp Val Ala Leu Glu Asp Ala Gly Tyr Tyr Arg Cys Val Leu Thr Phe
                660                 665                 670

Ala His Glu Gly Gln Gln Tyr Asn Ile Thr Arg Ser Ile Glu Leu Arg
            675                 680                 685

Ile Lys Lys Lys Glu Thr Ile Pro Val Ile Ile Ser Pro Leu
            690                 695                 700

Lys Thr Ile Ser Ala Ser Leu Gly Ser Arg Leu Thr Ile Pro Cys Lys
705                 710                 715                 720

Val Phe Leu Gly Thr Gly Thr Pro Leu Thr Thr Met Leu Trp Trp Thr
                725                 730                 735

Ala Asn Asp Thr His Ile Glu Ser Ala Tyr Pro Gly Gly Arg Val Thr
                740                 745                 750

Glu Gly Pro Arg Gln Glu Tyr Ser Glu Asn Asn Glu Asn Tyr Ile Glu
            755                 760                 765

Val Pro Leu Ile Phe Asp Pro Val Thr Arg Glu Asp Leu His Met Asp
770                 775                 780

Phe Lys Cys Val Val His Asn Thr Leu Ser Phe Gln Thr Leu Arg Thr
785                 790                 795                 800

Thr Val Lys Glu Thr Thr Thr Pro Ala Pro Arg Pro Pro Thr Pro Ala
                805                 810                 815

Pro Thr Ile Ala Ser Gln Pro Leu Ser Leu Arg Pro Glu Ala Cys Arg
            820                 825                 830

Pro Ala Ala Gly Gly Ala Val His Thr Arg Gly Leu Asp Phe Ala Cys
                835                 840                 845

Asp

<210> SEQ ID NO 2
<211> LENGTH: 632
<212> TYPE: PRT
<213> ORGANISM: Artificial
<220> FEATURE:
<223> OTHER INFORMATION: Model 2  AntiCD33  IgG4 (Hinge)  IL1R2
      (extracellular)  CD8 (Hinge)

<400> SEQUENCE: 2

Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
                20                  25                  30

Asn Ile His Trp Val Arg Gln Ala Pro Gly Gln Ser Leu Glu Trp Ile
            35                  40                  45

Gly Tyr Ile Tyr Pro Tyr Asn Gly Gly Thr Asp Tyr Asn Gln Lys Phe
        50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
                100                 105                 110
```

```
Thr Val Ser Ser Gly Gly Gly Ser Gly Gly Gly Ser Gly Gly
        115                 120                 125
Gly Gly Ser Asp Ile Gln Leu Thr Gln Ser Pro Ser Thr Leu Ser Ala
        130                 135                 140
Ser Val Gly Asp Arg Val Thr Ile Thr Cys Arg Ala Ser Glu Ser Leu
145                 150                 155                 160
Asp Asn Tyr Gly Ile Arg Phe Leu Thr Trp Phe Gln Gln Lys Pro Gly
                165                 170                 175
Lys Ala Pro Lys Leu Leu Met Tyr Ala Ala Ser Asn Gln Gly Ser Gly
                180                 185                 190
Val Pro Ser Arg Phe Ser Gly Ser Gly Thr Glu Phe Thr Leu
                195                 200                 205
Thr Ile Ser Ser Leu Gln Pro Asp Asp Phe Ala Thr Tyr Tyr Cys Gln
        210                 215                 220
Gln Thr Lys Glu Val Pro Trp Ser Phe Gly Gln Gly Thr Lys Val Glu
225                 230                 235                 240
Val Lys Arg Thr Val Glu Ser Lys Tyr Gly Pro Pro Cys Pro Ser Cys
                245                 250                 255
Pro Phe Thr Leu Gln Pro Ala Ala His Thr Gly Ala Ala Arg Ser Cys
                260                 265                 270
Arg Phe Arg Gly Arg His Tyr Lys Arg Glu Phe Arg Leu Glu Gly Glu
                275                 280                 285
Pro Val Ala Leu Arg Cys Pro Gln Val Pro Tyr Trp Leu Trp Ala Ser
                290                 295                 300
Val Ser Pro Arg Ile Asn Leu Thr Trp His Lys Asn Asp Ser Ala Arg
305                 310                 315                 320
Thr Val Pro Gly Glu Glu Glu Thr Arg Met Trp Ala Gln Asp Gly Ala
                325                 330                 335
Leu Trp Leu Leu Pro Ala Leu Gln Glu Asp Ser Gly Thr Tyr Val Cys
                340                 345                 350
Thr Thr Arg Asn Ala Ser Tyr Cys Asp Lys Met Ser Ile Glu Leu Arg
        355                 360                 365
Val Phe Glu Asn Thr Asp Ala Phe Leu Pro Phe Ile Ser Tyr Pro Gln
        370                 375                 380
Ile Leu Thr Leu Ser Thr Ser Gly Val Leu Val Cys Pro Asp Leu Ser
385                 390                 395                 400
Glu Phe Thr Arg Asp Lys Thr Asp Val Lys Ile Gln Trp Tyr Lys Asp
                405                 410                 415
Ser Leu Leu Leu Asp Lys Asp Asn Glu Lys Phe Leu Ser Val Arg Gly
                420                 425                 430
Thr Thr His Leu Leu Val His Asp Val Ala Leu Glu Asp Ala Gly Tyr
        435                 440                 445
Tyr Arg Cys Val Leu Thr Phe Ala His Glu Gly Gln Gln Tyr Asn Ile
        450                 455                 460
Thr Arg Ser Ile Glu Leu Arg Ile Lys Lys Lys Glu Glu Thr Ile
465                 470                 475                 480
Pro Val Ile Ile Ser Pro Leu Lys Thr Ile Ser Ala Ser Leu Gly Ser
                485                 490                 495
Arg Leu Thr Ile Pro Cys Lys Val Phe Leu Gly Thr Gly Thr Pro Leu
                500                 505                 510
Thr Thr Met Leu Trp Trp Thr Ala Asn Asp Thr His Ile Glu Ser Ala
                515                 520                 525
```

```
Tyr Pro Gly Gly Arg Val Thr Glu Gly Pro Arg Gln Glu Tyr Ser Glu
        530                 535                 540

Asn Asn Glu Asn Tyr Ile Glu Val Pro Leu Ile Phe Asp Pro Val Thr
545                 550                 555                 560

Arg Glu Asp Leu His Met Asp Phe Lys Cys Val Val His Asn Thr Leu
                565                 570                 575

Ser Phe Gln Thr Leu Arg Thr Val Lys Glu Thr Thr Thr Pro Ala
            580                 585                 590

Pro Arg Pro Pro Thr Pro Ala Pro Thr Ile Ala Ser Gln Pro Leu Ser
        595                 600                 605

Leu Arg Pro Glu Ala Cys Arg Pro Ala Ala Gly Gly Ala Val His Thr
610                 615                 620

Arg Gly Leu Asp Phe Ala Cys Asp
625                 630

<210> SEQ ID NO 3
<211> LENGTH: 837
<212> TYPE: PRT
<213> ORGANISM: Artificial
<220> FEATURE:
<223> OTHER INFORMATION: Model 3 AntiCD33 IgG4 (CH2CH3) IL1R2
      (extracellular) CD8 (Hinge)

<400> SEQUENCE: 3

Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Gly Ser Gly Gly Gly Gly Ser Gly Gly
        115                 120                 125

Gly Gly Ser Asp Ile Gln Leu Thr Gln Ser Pro Ser Thr Leu Ser Ala
    130                 135                 140

Ser Val Gly Asp Arg Val Thr Ile Thr Cys Arg Ala Ser Glu Ser Leu
145                 150                 155                 160

Asp Asn Tyr Gly Ile Arg Phe Leu Thr Trp Phe Gln Gln Lys Pro Gly
                165                 170                 175

Lys Ala Pro Lys Leu Leu Met Tyr Ala Ala Ser Asn Gln Gly Ser Gly
            180                 185                 190

Val Pro Ser Arg Phe Ser Gly Ser Gly Ser Gly Thr Glu Phe Thr Leu
        195                 200                 205

Thr Ile Ser Ser Leu Gln Pro Asp Asp Phe Ala Thr Tyr Tyr Cys Gln
    210                 215                 220

Gln Thr Lys Glu Val Pro Trp Ser Phe Gly Gln Gly Thr Lys Val Glu
225                 230                 235                 240

Val Lys Arg Thr Val Ala Pro Glu Phe Leu Gly Gly Pro Ser Val Phe
                245                 250                 255
```

```
Leu Phe Pro Pro Lys Pro Lys Asp Thr Leu Met Ile Ser Arg Thr Pro
            260                 265                 270

Glu Val Thr Cys Val Val Val Asp Val Ser Gln Glu Asp Pro Glu Val
        275                 280                 285

Gln Phe Asn Trp Tyr Val Asp Gly Val Glu Val His Asn Ala Lys Thr
    290                 295                 300

Lys Pro Arg Glu Glu Gln Phe Asn Ser Thr Tyr Arg Val Val Ser Val
305                 310                 315                 320

Leu Thr Val Leu His Gln Asp Trp Leu Asn Gly Lys Glu Tyr Lys Cys
                325                 330                 335

Lys Val Ser Asn Lys Gly Leu Pro Ser Ser Ile Glu Lys Thr Ile Ser
            340                 345                 350

Lys Ala Lys Gly Gln Pro Arg Glu Pro Gln Val Tyr Thr Leu Pro Pro
        355                 360                 365

Ser Gln Glu Glu Met Thr Lys Asn Gln Val Ser Leu Thr Cys Leu Val
    370                 375                 380

Lys Gly Phe Tyr Pro Ser Asp Ile Ala Val Glu Trp Glu Ser Asn Gly
385                 390                 395                 400

Gln Pro Glu Asn Asn Tyr Lys Thr Thr Pro Pro Val Leu Asp Ser Asp
                405                 410                 415

Gly Ser Phe Phe Leu Tyr Ser Arg Leu Thr Val Asp Lys Ser Arg Trp
            420                 425                 430

Gln Glu Gly Asn Val Phe Ser Cys Ser Val Met His Glu Ala Leu His
        435                 440                 445

Asn His Tyr Thr Gln Lys Ser Leu Ser Leu Ser Leu Gly Lys Phe Thr
    450                 455                 460

Leu Gln Pro Ala Ala His Thr Gly Ala Ala Arg Ser Cys Arg Phe Arg
465                 470                 475                 480

Gly Arg His Tyr Lys Arg Glu Phe Arg Leu Glu Gly Glu Pro Val Ala
                485                 490                 495

Leu Arg Cys Pro Gln Val Pro Tyr Trp Leu Trp Ala Ser Val Ser Pro
            500                 505                 510

Arg Ile Asn Leu Thr Trp His Lys Asn Asp Ser Ala Arg Thr Val Pro
        515                 520                 525

Gly Glu Glu Glu Thr Arg Met Trp Ala Gln Asp Gly Ala Leu Trp Leu
    530                 535                 540

Leu Pro Ala Leu Gln Glu Asp Ser Gly Thr Tyr Val Cys Thr Thr Arg
545                 550                 555                 560

Asn Ala Ser Tyr Cys Asp Lys Met Ser Ile Glu Leu Arg Val Phe Glu
                565                 570                 575

Asn Thr Asp Ala Phe Leu Pro Phe Ile Ser Tyr Pro Gln Ile Leu Thr
            580                 585                 590

Leu Ser Thr Ser Gly Val Leu Val Cys Pro Asp Leu Ser Glu Phe Thr
        595                 600                 605

Arg Asp Lys Thr Asp Val Lys Ile Gln Trp Tyr Lys Asp Ser Leu Leu
    610                 615                 620

Leu Asp Lys Asp Asn Glu Lys Phe Leu Ser Val Arg Gly Thr Thr His
625                 630                 635                 640

Leu Leu Val His Asp Val Ala Leu Glu Asp Ala Gly Tyr Tyr Arg Cys
                645                 650                 655

Val Leu Thr Phe Ala His Glu Gly Gln Gln Tyr Asn Ile Thr Arg Ser
            660                 665                 670
```

```
Ile Glu Leu Arg Ile Lys Lys Lys Glu Thr Ile Pro Val Ile
            675                 680                 685

Ile Ser Pro Leu Lys Thr Ile Ser Ala Ser Leu Gly Ser Arg Leu Thr
    690                 695                 700

Ile Pro Cys Lys Val Phe Leu Gly Thr Gly Thr Pro Leu Thr Thr Met
705                 710                 715                 720

Leu Trp Trp Thr Ala Asn Asp Thr His Ile Glu Ser Ala Tyr Pro Gly
                725                 730                 735

Gly Arg Val Thr Glu Gly Pro Arg Gln Glu Tyr Ser Glu Asn Asn Glu
            740                 745                 750

Asn Tyr Ile Glu Val Pro Leu Ile Phe Asp Pro Val Thr Arg Glu Asp
    755                 760                 765

Leu His Met Asp Phe Lys Cys Val Val His Asn Thr Leu Ser Phe Gln
    770                 775                 780

Thr Leu Arg Thr Thr Val Lys Glu Thr Thr Pro Ala Pro Arg Pro
785                 790                 795                 800

Pro Thr Pro Ala Pro Thr Ile Ala Ser Gln Pro Leu Ser Leu Arg Pro
                805                 810                 815

Glu Ala Cys Arg Pro Ala Ala Gly Gly Ala Val His Thr Arg Gly Leu
            820                 825                 830

Asp Phe Ala Cys Asp
        835

<210> SEQ ID NO 4
<211> LENGTH: 804
<212> TYPE: PRT
<213> ORGANISM: Artificial
<220> FEATURE:
<223> OTHER INFORMATION: Model 4  Anti-CD33  IgG4 (HingeCH2CH3)   IL1R2
      (extracellular)

<400> SEQUENCE: 4

Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Gly Ser Gly Gly Gly Gly Ser Gly Gly
        115                 120                 125

Gly Gly Ser Asp Ile Gln Leu Thr Gln Ser Pro Ser Thr Leu Ser Ala
    130                 135                 140

Ser Val Gly Asp Arg Val Thr Ile Thr Cys Arg Ala Ser Glu Ser Leu
145                 150                 155                 160

Asp Asn Tyr Gly Ile Arg Phe Leu Thr Trp Phe Gln Gln Lys Pro Gly
                165                 170                 175

Lys Ala Pro Lys Leu Leu Met Tyr Ala Ala Ser Asn Gln Gly Ser Gly
            180                 185                 190
```

```
Val Pro Ser Arg Phe Ser Gly Ser Gly Ser Gly Thr Glu Phe Thr Leu
            195                 200                 205

Thr Ile Ser Ser Leu Gln Pro Asp Asp Phe Ala Thr Tyr Tyr Cys Gln
            210                 215                 220

Gln Thr Lys Glu Val Pro Trp Ser Phe Gly Gln Gly Thr Lys Val Glu
225                 230                 235                 240

Val Lys Arg Thr Val Glu Ser Lys Tyr Gly Pro Pro Cys Pro Ser Cys
                245                 250                 255

Pro Ala Pro Glu Phe Leu Gly Gly Pro Ser Val Phe Leu Phe Pro Pro
            260                 265                 270

Lys Pro Lys Asp Thr Leu Met Ile Ser Arg Thr Pro Glu Val Thr Cys
            275                 280                 285

Val Val Val Asp Val Ser Gln Glu Asp Pro Glu Val Gln Phe Asn Trp
            290                 295                 300

Tyr Val Asp Gly Val Glu Val His Asn Ala Lys Thr Lys Pro Arg Glu
305                 310                 315                 320

Glu Gln Phe Asn Ser Thr Tyr Arg Val Val Ser Val Leu Thr Val Leu
                325                 330                 335

His Gln Asp Trp Leu Asn Gly Lys Glu Tyr Lys Cys Lys Val Ser Asn
            340                 345                 350

Lys Gly Leu Pro Ser Ser Ile Glu Lys Thr Ile Ser Lys Ala Lys Gly
            355                 360                 365

Gln Pro Arg Glu Pro Gln Val Tyr Thr Leu Pro Pro Ser Gln Glu Glu
            370                 375                 380

Met Thr Lys Asn Gln Val Ser Leu Thr Cys Leu Val Lys Gly Phe Tyr
385                 390                 395                 400

Pro Ser Asp Ile Ala Val Glu Trp Glu Ser Asn Gly Gln Pro Glu Asn
                405                 410                 415

Asn Tyr Lys Thr Thr Pro Pro Val Leu Asp Ser Asp Gly Ser Phe Phe
            420                 425                 430

Leu Tyr Ser Arg Leu Thr Val Asp Lys Ser Arg Trp Gln Glu Gly Asn
            435                 440                 445

Val Phe Ser Cys Ser Val Met His Glu Ala Leu His Asn His Tyr Thr
            450                 455                 460

Gln Lys Ser Leu Ser Leu Ser Leu Gly Lys Phe Thr Leu Gln Pro Ala
465                 470                 475                 480

Ala His Thr Gly Ala Ala Arg Ser Cys Arg Phe Arg Gly Arg His Tyr
                485                 490                 495

Lys Arg Glu Phe Arg Leu Glu Gly Glu Pro Val Ala Leu Arg Cys Pro
            500                 505                 510

Gln Val Pro Tyr Trp Leu Trp Ala Ser Val Ser Pro Arg Ile Asn Leu
            515                 520                 525

Thr Trp His Lys Asn Asp Ser Ala Arg Thr Val Pro Gly Glu Glu Glu
530                 535                 540

Thr Arg Met Trp Ala Gln Asp Gly Ala Leu Trp Leu Pro Ala Leu
545                 550                 555                 560

Gln Glu Asp Ser Gly Thr Tyr Val Cys Thr Thr Arg Asn Ala Ser Tyr
                565                 570                 575

Cys Asp Lys Met Ser Ile Glu Leu Arg Val Phe Glu Asn Thr Asp Ala
            580                 585                 590

Phe Leu Pro Phe Ile Ser Tyr Pro Gln Ile Leu Thr Leu Ser Thr Ser
            595                 600                 605
```

```
Gly Val Leu Val Cys Pro Asp Leu Ser Glu Phe Thr Arg Asp Lys Thr
        610                 615                 620

Asp Val Lys Ile Gln Trp Tyr Lys Asp Ser Leu Leu Leu Asp Lys Asp
625                 630                 635                 640

Asn Glu Lys Phe Leu Ser Val Arg Gly Thr Thr His Leu Leu Val His
            645                 650                 655

Asp Val Ala Leu Glu Asp Ala Gly Tyr Tyr Arg Cys Val Leu Thr Phe
        660                 665                 670

Ala His Glu Gly Gln Gln Tyr Asn Ile Thr Arg Ser Ile Glu Leu Arg
            675                 680                 685

Ile Lys Lys Lys Lys Glu Glu Thr Ile Pro Val Ile Ile Ser Pro Leu
690                 695                 700

Lys Thr Ile Ser Ala Ser Leu Gly Ser Arg Leu Thr Ile Pro Cys Lys
705                 710                 715                 720

Val Phe Leu Gly Thr Gly Thr Pro Leu Thr Thr Met Leu Trp Trp Thr
                725                 730                 735

Ala Asn Asp Thr His Ile Glu Ser Ala Tyr Pro Gly Gly Arg Val Thr
            740                 745                 750

Glu Gly Pro Arg Gln Glu Tyr Ser Glu Asn Asn Glu Asn Tyr Ile Glu
            755                 760                 765

Val Pro Leu Ile Phe Asp Pro Val Thr Arg Glu Asp Leu His Met Asp
770                 775                 780

Phe Lys Cys Val Val His Asn Thr Leu Ser Phe Gln Thr Leu Arg Thr
785                 790                 795                 800

Thr Val Lys Glu

<210> SEQ ID NO 5
<211> LENGTH: 587
<212> TYPE: PRT
<213> ORGANISM: Artificial
<220> FEATURE:
<223> OTHER INFORMATION: Model 5  AntiCD33  IgG4 (Hinge)   IL1R2
      (extracellular)

<400> SEQUENCE: 5

Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Gly Ser Gly Gly Gly Gly Ser Gly Gly
        115                 120                 125

Gly Gly Ser Asp Ile Gln Leu Thr Gln Ser Pro Ser Thr Leu Ser Ala
    130                 135                 140

Ser Val Gly Asp Arg Val Thr Ile Thr Cys Arg Ala Ser Glu Ser Leu
145                 150                 155                 160
```

-continued

Asp Asn Tyr Gly Ile Arg Phe Leu Thr Trp Phe Gln Gln Lys Pro Gly
            165                 170                 175

Lys Ala Pro Lys Leu Leu Met Tyr Ala Ala Ser Asn Gln Gly Ser Gly
            180                 185                 190

Val Pro Ser Arg Phe Ser Gly Ser Gly Ser Gly Thr Glu Phe Thr Leu
            195                 200                 205

Thr Ile Ser Ser Leu Gln Pro Asp Asp Phe Ala Thr Tyr Tyr Cys Gln
            210                 215                 220

Gln Thr Lys Glu Val Pro Trp Ser Phe Gly Gln Gly Thr Lys Val Glu
225                 230                 235                 240

Val Lys Arg Thr Val Glu Ser Lys Tyr Gly Pro Pro Cys Pro Ser Cys
            245                 250                 255

Pro Phe Thr Leu Gln Pro Ala Ala His Thr Gly Ala Ala Arg Ser Cys
            260                 265                 270

Arg Phe Arg Gly Arg His Tyr Lys Arg Glu Phe Arg Leu Glu Gly Glu
            275                 280                 285

Pro Val Ala Leu Arg Cys Pro Gln Val Pro Tyr Trp Leu Trp Ala Ser
            290                 295                 300

Val Ser Pro Arg Ile Asn Leu Thr Trp His Lys Asn Asp Ser Ala Arg
305                 310                 315                 320

Thr Val Pro Gly Glu Glu Thr Arg Met Trp Ala Gln Asp Gly Ala
            325                 330                 335

Leu Trp Leu Leu Pro Ala Leu Gln Glu Asp Ser Gly Thr Tyr Val Cys
            340                 345                 350

Thr Thr Arg Asn Ala Ser Tyr Cys Asp Lys Met Ser Ile Glu Leu Arg
            355                 360                 365

Val Phe Glu Asn Thr Asp Ala Phe Leu Pro Phe Ile Ser Tyr Pro Gln
            370                 375                 380

Ile Leu Thr Leu Ser Thr Ser Gly Val Leu Val Cys Pro Asp Leu Ser
385                 390                 395                 400

Glu Phe Thr Arg Asp Lys Thr Asp Val Lys Ile Gln Trp Tyr Lys Asp
            405                 410                 415

Ser Leu Leu Leu Asp Lys Asp Asn Glu Lys Phe Leu Ser Val Arg Gly
            420                 425                 430

Thr Thr His Leu Leu Val His Asp Val Ala Leu Glu Asp Ala Gly Tyr
            435                 440                 445

Tyr Arg Cys Val Leu Thr Phe Ala His Glu Gly Gln Gln Tyr Asn Ile
            450                 455                 460

Thr Arg Ser Ile Glu Leu Arg Ile Lys Lys Lys Glu Glu Thr Ile
465                 470                 475                 480

Pro Val Ile Ile Ser Pro Leu Lys Thr Ile Ser Ala Ser Leu Gly Ser
            485                 490                 495

Arg Leu Thr Ile Pro Cys Lys Val Phe Leu Gly Thr Gly Thr Pro Leu
            500                 505                 510

Thr Thr Met Leu Trp Trp Thr Ala Asn Asp Thr His Ile Glu Ser Ala
            515                 520                 525

Tyr Pro Gly Gly Arg Val Thr Glu Gly Pro Arg Gln Glu Tyr Ser Glu
            530                 535                 540

Asn Asn Glu Asn Tyr Ile Glu Val Pro Leu Ile Phe Asp Pro Val Thr
545                 550                 555                 560

Arg Glu Asp Leu His Met Asp Phe Lys Cys Val Val His Asn Thr Leu
            565                 570                 575

Ser Phe Gln Thr Leu Arg Thr Thr Val Lys Glu

<210> SEQ ID NO 6
<211> LENGTH: 792
<212> TYPE: PRT
<213> ORGANISM: Artificial
<220> FEATURE:
<223> OTHER INFORMATION: Model 6 AntiCD33 IgG4 (CH2CH3) IL1R2 (extracellular)

<400> SEQUENCE: 6

```
Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Ser Gly Gly Gly Ser Gly Gly
        115                 120                 125

Gly Gly Ser Asp Ile Gln Leu Thr Gln Ser Pro Ser Thr Leu Ser Ala
    130                 135                 140

Ser Val Gly Asp Arg Val Thr Ile Thr Cys Arg Ala Ser Glu Ser Leu
145                 150                 155                 160

Asp Asn Tyr Gly Ile Arg Phe Leu Thr Trp Phe Gln Gln Lys Pro Gly
                165                 170                 175

Lys Ala Pro Lys Leu Leu Met Tyr Ala Ala Ser Asn Gln Gly Ser Gly
            180                 185                 190

Val Pro Ser Arg Phe Ser Gly Ser Gly Thr Glu Phe Thr Leu
        195                 200                 205

Thr Ile Ser Ser Leu Gln Pro Asp Asp Phe Ala Thr Tyr Tyr Cys Gln
    210                 215                 220

Gln Thr Lys Glu Val Pro Trp Ser Phe Gly Gln Gly Thr Lys Val Glu
225                 230                 235                 240

Val Lys Arg Thr Val Ala Pro Glu Phe Leu Gly Gly Pro Ser Val Phe
                245                 250                 255

Leu Phe Pro Pro Lys Pro Lys Asp Thr Leu Met Ile Ser Arg Thr Pro
            260                 265                 270

Glu Val Thr Cys Val Val Val Asp Val Ser Gln Glu Asp Pro Glu Val
        275                 280                 285

Gln Phe Asn Trp Tyr Val Asp Gly Val Glu Val His Asn Ala Lys Thr
    290                 295                 300

Lys Pro Arg Glu Glu Gln Phe Asn Ser Thr Tyr Arg Val Val Ser Val
305                 310                 315                 320

Leu Thr Val Leu His Gln Asp Trp Leu Asn Gly Lys Glu Tyr Lys Cys
                325                 330                 335

Lys Val Ser Asn Lys Gly Leu Pro Ser Ser Ile Glu Lys Thr Ile Ser
            340                 345                 350
```

-continued

```
Lys Ala Lys Gly Gln Pro Arg Glu Pro Gln Val Tyr Thr Leu Pro Pro
            355                 360                 365

Ser Gln Glu Glu Met Thr Lys Asn Gln Val Ser Leu Thr Cys Leu Val
        370                 375                 380

Lys Gly Phe Tyr Pro Ser Asp Ile Ala Val Glu Trp Glu Ser Asn Gly
385                 390                 395                 400

Gln Pro Glu Asn Asn Tyr Lys Thr Thr Pro Pro Val Leu Asp Ser Asp
                405                 410                 415

Gly Ser Phe Phe Leu Tyr Ser Arg Leu Thr Val Asp Lys Ser Arg Trp
            420                 425                 430

Gln Glu Gly Asn Val Phe Ser Cys Ser Val Met His Glu Ala Leu His
        435                 440                 445

Asn His Tyr Thr Gln Lys Ser Leu Ser Leu Ser Leu Gly Lys Phe Thr
    450                 455                 460

Leu Gln Pro Ala Ala His Thr Gly Ala Ala Arg Ser Cys Arg Phe Arg
465                 470                 475                 480

Gly Arg His Tyr Lys Arg Glu Phe Arg Leu Glu Gly Glu Pro Val Ala
                485                 490                 495

Leu Arg Cys Pro Gln Val Pro Tyr Trp Leu Trp Ala Ser Val Ser Pro
            500                 505                 510

Arg Ile Asn Leu Thr Trp His Lys Asn Asp Ser Ala Arg Thr Val Pro
        515                 520                 525

Gly Glu Glu Glu Thr Arg Met Trp Ala Gln Asp Gly Ala Leu Trp Leu
    530                 535                 540

Leu Pro Ala Leu Gln Glu Asp Ser Gly Thr Tyr Val Cys Thr Thr Arg
545                 550                 555                 560

Asn Ala Ser Tyr Cys Asp Lys Met Ser Ile Glu Leu Arg Val Phe Glu
                565                 570                 575

Asn Thr Asp Ala Phe Leu Pro Phe Ile Ser Tyr Pro Gln Ile Leu Thr
            580                 585                 590

Leu Ser Thr Ser Gly Val Leu Val Cys Pro Asp Leu Ser Glu Phe Thr
        595                 600                 605

Arg Asp Lys Thr Asp Val Lys Ile Gln Trp Tyr Lys Asp Ser Leu Leu
    610                 615                 620

Leu Asp Lys Asp Asn Glu Lys Phe Leu Ser Val Arg Gly Thr Thr His
625                 630                 635                 640

Leu Leu Val His Asp Val Ala Leu Glu Asp Ala Gly Tyr Tyr Arg Cys
                645                 650                 655

Val Leu Thr Phe Ala His Glu Gly Gln Gln Tyr Asn Ile Thr Arg Ser
            660                 665                 670

Ile Glu Leu Arg Ile Lys Lys Lys Glu Glu Thr Ile Pro Val Ile
        675                 680                 685

Ile Ser Pro Leu Lys Thr Ile Ser Ala Ser Leu Gly Ser Arg Leu Thr
    690                 695                 700

Ile Pro Cys Lys Val Phe Leu Gly Thr Gly Thr Pro Leu Thr Thr Met
705                 710                 715                 720

Leu Trp Trp Thr Ala Asn Asp Thr His Ile Glu Ser Ala Tyr Pro Gly
                725                 730                 735

Gly Arg Val Thr Glu Gly Pro Arg Gln Glu Tyr Ser Glu Asn Asn Glu
            740                 745                 750

Asn Tyr Ile Glu Val Pro Leu Ile Phe Asp Pro Val Thr Arg Glu Asp
        755                 760                 765

Leu His Met Asp Phe Lys Cys Val Val His Asn Thr Leu Ser Phe Gln
```

```
            770                 775                 780
Thr Leu Arg Thr Thr Val Lys Glu
785                 790

<210> SEQ ID NO 7
<211> LENGTH: 853
<212> TYPE: PRT
<213> ORGANISM: Artificial
<220> FEATURE:
<223> OTHER INFORMATION: Model 7  AntiCD123  IgG4 (HingeCH2CH3)  IL1R2
      (extracellular)  CD8 (Hinge)

<400> SEQUENCE: 7

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

Gly Thr Met Val Thr Val Ser Ser Gly Gly Gly Ser Gly Gly Gly
        115                 120                 125

Gly Ser Gly Gly Gly Ser Asp Ile Val Met Thr Gln Ser Pro Asp
    130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Glu Ser Lys Tyr Gly Pro Pro
                245                 250                 255

Cys Pro Ser Cys Pro Ala Pro Glu Phe Leu Gly Gly Pro Ser Val Phe
            260                 265                 270

Leu Phe Pro Pro Lys Pro Lys Asp Thr Leu Met Ile Ser Arg Thr Pro
        275                 280                 285

Glu Val Thr Cys Val Val Val Asp Val Ser Gln Glu Asp Pro Glu Val
    290                 295                 300

Gln Phe Asn Trp Tyr Val Asp Gly Val Glu Val His Asn Ala Lys Thr
305                 310                 315                 320

Lys Pro Arg Glu Glu Gln Phe Asn Ser Thr Tyr Arg Val Val Ser Val
                325                 330                 335
```

```
Leu Thr Val Leu His Gln Asp Trp Leu Asn Gly Lys Glu Tyr Lys Cys
                340                 345                 350

Lys Val Ser Asn Lys Gly Leu Pro Ser Ser Ile Glu Lys Thr Ile Ser
            355                 360                 365

Lys Ala Lys Gly Gln Pro Arg Glu Pro Gln Val Tyr Thr Leu Pro Pro
        370                 375                 380

Ser Gln Glu Glu Met Thr Lys Asn Gln Val Ser Leu Thr Cys Leu Val
385                 390                 395                 400

Lys Gly Phe Tyr Pro Ser Asp Ile Ala Val Glu Trp Glu Ser Asn Gly
                405                 410                 415

Gln Pro Glu Asn Asn Tyr Lys Thr Thr Pro Pro Val Leu Asp Ser Asp
            420                 425                 430

Gly Ser Phe Phe Leu Tyr Ser Arg Leu Thr Val Asp Lys Ser Arg Trp
        435                 440                 445

Gln Glu Gly Asn Val Phe Ser Cys Ser Val Met His Glu Ala Leu His
    450                 455                 460

Asn His Tyr Thr Gln Lys Ser Leu Ser Leu Ser Leu Gly Lys Phe Thr
465                 470                 475                 480

Leu Gln Pro Ala Ala His Thr Gly Ala Ala Arg Ser Cys Arg Phe Arg
                485                 490                 495

Gly Arg His Tyr Lys Arg Glu Phe Arg Leu Glu Gly Glu Pro Val Ala
            500                 505                 510

Leu Arg Cys Pro Gln Val Pro Tyr Trp Leu Trp Ala Ser Val Ser Pro
        515                 520                 525

Arg Ile Asn Leu Thr Trp His Lys Asn Asp Ser Ala Arg Thr Val Pro
    530                 535                 540

Gly Glu Glu Glu Thr Arg Met Trp Ala Gln Asp Gly Ala Leu Trp Leu
545                 550                 555                 560

Leu Pro Ala Leu Gln Glu Asp Ser Gly Thr Tyr Val Cys Thr Thr Arg
                565                 570                 575

Asn Ala Ser Tyr Cys Asp Lys Met Ser Ile Glu Leu Arg Val Phe Glu
            580                 585                 590

Asn Thr Asp Ala Phe Leu Pro Phe Ile Ser Tyr Pro Gln Ile Leu Thr
        595                 600                 605

Leu Ser Thr Ser Gly Val Leu Val Cys Pro Asp Leu Ser Glu Phe Thr
    610                 615                 620

Arg Asp Lys Thr Asp Val Lys Ile Gln Trp Tyr Lys Asp Ser Leu Leu
625                 630                 635                 640

Leu Asp Lys Asp Asn Glu Lys Phe Leu Ser Val Arg Gly Thr Thr His
                645                 650                 655

Leu Leu Val His Asp Val Ala Leu Glu Asp Ala Gly Tyr Tyr Arg Cys
            660                 665                 670

Val Leu Thr Phe Ala His Glu Gly Gln Gln Tyr Asn Ile Thr Arg Ser
        675                 680                 685

Ile Glu Leu Arg Ile Lys Lys Lys Glu Glu Thr Ile Pro Val Ile
    690                 695                 700

Ile Ser Pro Leu Lys Thr Ile Ser Ala Ser Leu Gly Ser Arg Leu Thr
705                 710                 715                 720

Ile Pro Cys Lys Val Phe Leu Gly Thr Gly Thr Pro Leu Thr Thr Met
                725                 730                 735

Leu Trp Trp Thr Ala Asn Asp Thr His Ile Glu Ser Ala Tyr Pro Gly
            740                 745                 750

Gly Arg Val Thr Glu Gly Pro Arg Gln Glu Tyr Ser Glu Asn Asn Glu
```

-continued

```
                    755                 760                 765
Asn Tyr Ile Glu Val Pro Leu Ile Phe Asp Pro Val Thr Arg Glu Asp
    770                 775                 780

Leu His Met Asp Phe Lys Cys Val Val His Asn Thr Leu Ser Phe Gln
785                 790                 795                 800

Thr Leu Arg Thr Thr Val Lys Glu Thr Thr Pro Ala Pro Arg Pro
                    805                 810                 815

Pro Thr Pro Ala Pro Thr Ile Ala Ser Gln Pro Leu Ser Leu Arg Pro
                820                 825                 830

Glu Ala Cys Arg Pro Ala Ala Gly Gly Ala Val His Thr Arg Gly Leu
                835                 840                 845

Asp Phe Ala Cys Asp
                850

<210> SEQ ID NO 8
<211> LENGTH: 636
<212> TYPE: PRT
<213> ORGANISM: Artificial
<220> FEATURE:
<223> OTHER INFORMATION: Model 8  AntiCD123  IgG4 (Hinge)  IL1R2
      (extracellular)  CD8 (Hinge)

<400> SEQUENCE: 8

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
                20                  25                  30

Tyr Met Lys Trp Ala Arg Gln Met Pro Gly Lys Gly Leu Glu Trp Met
            35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
                100                 105                 110

Gly Thr Met Val Thr Val Ser Ser Gly Gly Gly Gly Ser Gly Gly Gly
            115                 120                 125

Gly Ser Gly Gly Gly Gly Ser Asp Ile Val Met Thr Gln Ser Pro Asp
    130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Glu Ser Lys Tyr Gly Pro Pro
                245                 250                 255
```

Cys Pro Ser Cys Pro Phe Thr Leu Gln Pro Ala Ala His Thr Gly Ala
            260                 265                 270

Ala Arg Ser Cys Arg Phe Arg Gly Arg His Tyr Lys Arg Glu Phe Arg
        275                 280                 285

Leu Glu Gly Glu Pro Val Ala Leu Arg Cys Pro Gln Val Pro Tyr Trp
    290                 295                 300

Leu Trp Ala Ser Val Ser Pro Arg Ile Asn Leu Thr Trp His Lys Asn
305                 310                 315                 320

Asp Ser Ala Arg Thr Val Pro Gly Glu Glu Thr Arg Met Trp Ala
            325                 330                 335

Gln Asp Gly Ala Leu Trp Leu Leu Pro Ala Leu Gln Glu Asp Ser Gly
        340                 345                 350

Thr Tyr Val Cys Thr Thr Arg Asn Ala Ser Tyr Cys Asp Lys Met Ser
    355                 360                 365

Ile Glu Leu Arg Val Phe Glu Asn Thr Asp Ala Phe Leu Pro Phe Ile
370                 375                 380

Ser Tyr Pro Gln Ile Leu Thr Leu Ser Thr Ser Gly Val Leu Val Cys
385                 390                 395                 400

Pro Asp Leu Ser Glu Phe Thr Arg Asp Lys Thr Asp Val Lys Ile Gln
            405                 410                 415

Trp Tyr Lys Asp Ser Leu Leu Leu Asp Lys Asp Asn Glu Lys Phe Leu
        420                 425                 430

Ser Val Arg Gly Thr Thr His Leu Leu Val His Asp Val Ala Leu Glu
    435                 440                 445

Asp Ala Gly Tyr Tyr Arg Cys Val Leu Thr Phe Ala His Glu Gly Gln
450                 455                 460

Gln Tyr Asn Ile Thr Arg Ser Ile Glu Leu Arg Ile Lys Lys Lys
465                 470                 475                 480

Glu Glu Thr Ile Pro Val Ile Ser Pro Leu Lys Thr Ile Ser Ala
            485                 490                 495

Ser Leu Gly Ser Arg Leu Thr Ile Pro Cys Lys Val Phe Leu Gly Thr
        500                 505                 510

Gly Thr Pro Leu Thr Thr Met Leu Trp Trp Thr Ala Asn Asp Thr His
    515                 520                 525

Ile Glu Ser Ala Tyr Pro Gly Gly Arg Val Thr Glu Gly Pro Arg Gln
530                 535                 540

Glu Tyr Ser Glu Asn Asn Glu Asn Tyr Ile Glu Val Pro Leu Ile Phe
545                 550                 555                 560

Asp Pro Val Thr Arg Glu Asp Leu His Met Asp Phe Lys Cys Val Val
            565                 570                 575

His Asn Thr Leu Ser Phe Gln Thr Leu Arg Thr Thr Val Lys Glu Thr
        580                 585                 590

Thr Thr Pro Ala Pro Arg Pro Thr Pro Ala Pro Thr Ile Ala Ser
    595                 600                 605

Gln Pro Leu Ser Leu Arg Pro Glu Ala Cys Arg Pro Ala Ala Gly Gly
610                 615                 620

Ala Val His Thr Arg Gly Leu Asp Phe Ala Cys Asp
625                 630                 635

<210> SEQ ID NO 9
<211> LENGTH: 841
<212> TYPE: PRT
<213> ORGANISM: Artificial
<220> FEATURE:
<223> OTHER INFORMATION: Model 9 AntiCD123 IgG4 (CH2CH3) IL1R2

-continued (extracellular) CD8 (Hinge)

<400> SEQUENCE: 9

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

Gly Thr Met Val Thr Val Ser Ser Gly Gly Gly Gly Ser Gly Gly Gly
        115                 120                 125

Gly Ser Gly Gly Gly Gly Ser Asp Ile Val Met Thr Gln Ser Pro Asp
    130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Ala Pro Glu Phe Leu Gly Gly
                245                 250                 255

Pro Ser Val Phe Leu Phe Pro Pro Lys Pro Lys Asp Thr Leu Met Ile
            260                 265                 270

Ser Arg Thr Pro Glu Val Thr Cys Val Val Asp Val Ser Gln Glu
        275                 280                 285

Asp Pro Glu Val Gln Phe Asn Trp Tyr Val Asp Gly Val Glu Val His
    290                 295                 300

Asn Ala Lys Thr Lys Pro Arg Glu Glu Gln Phe Asn Ser Thr Tyr Arg
305                 310                 315                 320

Val Val Ser Val Leu Thr Val Leu His Gln Asp Trp Leu Asn Gly Lys
                325                 330                 335

Glu Tyr Lys Cys Lys Val Ser Asn Lys Gly Leu Pro Ser Ser Ile Glu
            340                 345                 350

Lys Thr Ile Ser Lys Ala Lys Gly Gln Pro Arg Glu Pro Gln Val Tyr
        355                 360                 365

Thr Leu Pro Pro Ser Gln Glu Glu Met Thr Lys Asn Gln Val Ser Leu
    370                 375                 380

Thr Cys Leu Val Lys Gly Phe Tyr Pro Ser Asp Ile Ala Val Glu Trp
385                 390                 395                 400

```
Glu Ser Asn Gly Gln Pro Glu Asn Asn Tyr Lys Thr Thr Pro Pro Val
                405                 410                 415

Leu Asp Ser Asp Gly Ser Phe Phe Leu Tyr Ser Arg Leu Thr Val Asp
            420                 425                 430

Lys Ser Arg Trp Gln Glu Gly Asn Val Phe Ser Cys Ser Val Met His
        435                 440                 445

Glu Ala Leu His Asn His Tyr Thr Gln Lys Ser Leu Ser Leu Ser Leu
    450                 455                 460

Gly Lys Phe Thr Leu Gln Pro Ala Ala His Thr Gly Ala Ala Arg Ser
465                 470                 475                 480

Cys Arg Phe Arg Gly Arg His Tyr Lys Arg Glu Phe Arg Leu Glu Gly
                485                 490                 495

Glu Pro Val Ala Leu Arg Cys Pro Gln Val Pro Tyr Trp Leu Trp Ala
            500                 505                 510

Ser Val Ser Pro Arg Ile Asn Leu Thr Trp His Lys Asn Asp Ser Ala
        515                 520                 525

Arg Thr Val Pro Gly Glu Glu Thr Arg Met Trp Ala Gln Asp Gly
    530                 535                 540

Ala Leu Trp Leu Leu Pro Ala Leu Gln Glu Asp Ser Gly Thr Tyr Val
545                 550                 555                 560

Cys Thr Thr Arg Asn Ala Ser Tyr Cys Asp Lys Met Ser Ile Glu Leu
                565                 570                 575

Arg Val Phe Glu Asn Thr Asp Ala Phe Leu Pro Phe Ile Ser Tyr Pro
            580                 585                 590

Gln Ile Leu Thr Leu Ser Thr Ser Gly Val Leu Val Cys Pro Asp Leu
        595                 600                 605

Ser Glu Phe Thr Arg Asp Lys Thr Asp Val Lys Ile Gln Trp Tyr Lys
    610                 615                 620

Asp Ser Leu Leu Leu Asp Lys Asp Asn Glu Lys Phe Leu Ser Val Arg
625                 630                 635                 640

Gly Thr Thr His Leu Leu Val His Asp Val Ala Leu Glu Asp Ala Gly
                645                 650                 655

Tyr Tyr Arg Cys Val Leu Thr Phe Ala His Glu Gly Gln Gln Tyr Asn
            660                 665                 670

Ile Thr Arg Ser Ile Glu Leu Arg Ile Lys Lys Lys Glu Glu Thr
        675                 680                 685

Ile Pro Val Ile Ile Ser Pro Leu Lys Thr Ile Ser Ala Ser Leu Gly
    690                 695                 700

Ser Arg Leu Thr Ile Pro Cys Lys Val Phe Leu Gly Thr Gly Thr Pro
705                 710                 715                 720

Leu Thr Thr Met Leu Trp Trp Thr Ala Asn Asp Thr His Ile Glu Ser
                725                 730                 735

Ala Tyr Pro Gly Gly Arg Val Thr Glu Gly Pro Arg Gln Glu Tyr Ser
            740                 745                 750

Glu Asn Asn Glu Asn Tyr Ile Glu Val Pro Leu Ile Phe Asp Pro Val
        755                 760                 765

Thr Arg Glu Asp Leu His Met Asp Phe Lys Cys Val Val His Asn Thr
    770                 775                 780

Leu Ser Phe Gln Thr Leu Arg Thr Thr Val Lys Glu Thr Thr Pro
785                 790                 795                 800

Ala Pro Arg Pro Pro Thr Pro Ala Pro Thr Ile Ala Ser Gln Pro Leu
                805                 810                 815

Ser Leu Arg Pro Glu Ala Cys Arg Pro Ala Ala Gly Gly Ala Val His
```

```
                        820                 825                 830
Thr Arg Gly Leu Asp Phe Ala Cys Asp
            835                 840

<210> SEQ ID NO 10
<211> LENGTH: 808
<212> TYPE: PRT
<213> ORGANISM: Artificial
<220> FEATURE:
<223> OTHER INFORMATION: Model 10  AntiCD123  IgG4 (Hinge-CH2CH3)  IL1R2
      (extracellular)

<400> SEQUENCE: 10

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

Gly Thr Met Val Thr Val Ser Ser Gly Gly Gly Ser Gly Gly Gly
        115                 120                 125

Gly Ser Gly Gly Gly Ser Asp Ile Val Met Thr Gln Ser Pro Asp
    130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Glu Ser Lys Tyr Gly Pro Pro
                245                 250                 255

Cys Pro Ser Cys Pro Ala Pro Glu Phe Leu Gly Gly Pro Ser Val Phe
            260                 265                 270

Leu Phe Pro Pro Lys Pro Lys Asp Thr Leu Met Ile Ser Arg Thr Pro
        275                 280                 285

Glu Val Thr Cys Val Val Val Asp Val Ser Gln Glu Asp Pro Glu Val
    290                 295                 300

Gln Phe Asn Trp Tyr Val Asp Gly Val Glu Val His Asn Ala Lys Thr
305                 310                 315                 320

Lys Pro Arg Glu Glu Gln Phe Asn Ser Thr Tyr Arg Val Val Ser Val
                325                 330                 335
```

```
Leu Thr Val Leu His Gln Asp Trp Leu Asn Gly Lys Glu Tyr Lys Cys
                340                 345                 350

Lys Val Ser Asn Lys Gly Leu Pro Ser Ser Ile Glu Lys Thr Ile Ser
            355                 360                 365

Lys Ala Lys Gly Gln Pro Arg Glu Pro Gln Val Tyr Thr Leu Pro Pro
        370                 375                 380

Ser Gln Glu Glu Met Thr Lys Asn Gln Val Ser Leu Thr Cys Leu Val
385                 390                 395                 400

Lys Gly Phe Tyr Pro Ser Asp Ile Ala Val Glu Trp Glu Ser Asn Gly
                405                 410                 415

Gln Pro Glu Asn Asn Tyr Lys Thr Thr Pro Pro Val Leu Asp Ser Asp
            420                 425                 430

Gly Ser Phe Phe Leu Tyr Ser Arg Leu Thr Val Asp Lys Ser Arg Trp
        435                 440                 445

Gln Glu Gly Asn Val Phe Ser Cys Ser Val Met His Glu Ala Leu His
    450                 455                 460

Asn His Tyr Thr Gln Lys Ser Leu Ser Leu Ser Leu Gly Lys Phe Thr
465                 470                 475                 480

Leu Gln Pro Ala Ala His Thr Gly Ala Ala Arg Ser Cys Arg Phe Arg
                485                 490                 495

Gly Arg His Tyr Lys Arg Glu Phe Arg Leu Glu Gly Glu Pro Val Ala
            500                 505                 510

Leu Arg Cys Pro Gln Val Pro Tyr Trp Leu Trp Ala Ser Val Ser Pro
        515                 520                 525

Arg Ile Asn Leu Thr Trp His Lys Asn Asp Ser Ala Arg Thr Val Pro
    530                 535                 540

Gly Glu Glu Glu Thr Arg Met Trp Ala Gln Asp Gly Ala Leu Trp Leu
545                 550                 555                 560

Leu Pro Ala Leu Gln Glu Asp Ser Gly Thr Tyr Val Cys Thr Thr Arg
                565                 570                 575

Asn Ala Ser Tyr Cys Asp Lys Met Ser Ile Glu Leu Arg Val Phe Glu
            580                 585                 590

Asn Thr Asp Ala Phe Leu Pro Phe Ile Ser Tyr Pro Gln Ile Leu Thr
        595                 600                 605

Leu Ser Thr Ser Gly Val Leu Val Cys Pro Asp Leu Ser Glu Phe Thr
    610                 615                 620

Arg Asp Lys Thr Asp Val Lys Ile Gln Trp Tyr Lys Asp Ser Leu Leu
625                 630                 635                 640

Leu Asp Lys Asp Asn Glu Lys Phe Leu Ser Val Arg Gly Thr Thr His
                645                 650                 655

Leu Leu Val His Asp Val Ala Leu Glu Asp Ala Gly Tyr Tyr Arg Cys
            660                 665                 670

Val Leu Thr Phe Ala His Glu Gly Gln Gln Tyr Asn Ile Thr Arg Ser
        675                 680                 685

Ile Glu Leu Arg Ile Lys Lys Lys Glu Thr Ile Pro Val Ile
    690                 695                 700

Ile Ser Pro Leu Lys Thr Ile Ser Ala Ser Leu Gly Ser Arg Leu Thr
705                 710                 715                 720

Ile Pro Cys Lys Val Phe Leu Gly Thr Gly Thr Pro Leu Thr Thr Met
                725                 730                 735

Leu Trp Trp Thr Ala Asn Asp Thr His Ile Glu Ser Ala Tyr Pro Gly
            740                 745                 750

Gly Arg Val Thr Glu Gly Pro Arg Gln Glu Tyr Ser Glu Asn Asn Glu
```

```
                755                 760                 765
Asn Tyr Ile Glu Val Pro Leu Ile Phe Asp Pro Val Thr Arg Glu Asp
    770                 775                 780

Leu His Met Asp Phe Lys Cys Val Val His Asn Thr Leu Ser Phe Gln
785                 790                 795                 800

Thr Leu Arg Thr Thr Val Lys Glu
                805

<210> SEQ ID NO 11
<211> LENGTH: 591
<212> TYPE: PRT
<213> ORGANISM: Artificial
<220> FEATURE:
<223> OTHER INFORMATION: Model 11 AntiCD123 IgG4 (Hinge) IL1R2
      (extracellular)

<400> SEQUENCE: 11

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
                20                  25                  30

Tyr Met Lys Trp Ala Arg Gln Met Pro Gly Lys Gly Leu Glu Trp Met
            35                  40                  45

Gly Asp Ile Ile Pro Ser Asn Gly Ala Thr Phe Tyr Asn Gln Lys Phe
50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

Gly Thr Met Val Thr Val Ser Ser Gly Gly Gly Gly Ser Gly Gly Gly
        115                 120                 125

Gly Ser Gly Gly Gly Gly Ser Asp Ile Val Met Thr Gln Ser Pro Asp
    130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Glu Ser Lys Tyr Gly Pro Pro
                245                 250                 255

Cys Pro Ser Cys Pro Phe Thr Leu Gln Pro Ala Ala His Thr Gly Ala
            260                 265                 270

Ala Arg Ser Cys Arg Phe Arg Gly Arg His Tyr Lys Arg Glu Phe Arg
        275                 280                 285

Leu Glu Gly Glu Pro Val Ala Leu Arg Cys Pro Gln Val Pro Tyr Trp
    290                 295                 300
```

-continued

```
Leu Trp Ala Ser Val Ser Pro Arg Ile Asn Leu Thr Trp His Lys Asn
305                 310                 315                 320

Asp Ser Ala Arg Thr Val Pro Gly Glu Glu Thr Arg Met Trp Ala
            325                 330                 335

Gln Asp Gly Ala Leu Trp Leu Leu Pro Ala Leu Gln Glu Asp Ser Gly
            340                 345                 350

Thr Tyr Val Cys Thr Thr Arg Asn Ala Ser Tyr Cys Asp Lys Met Ser
            355                 360                 365

Ile Glu Leu Arg Val Phe Glu Asn Thr Asp Ala Phe Leu Pro Phe Ile
            370                 375                 380

Ser Tyr Pro Gln Ile Leu Thr Leu Ser Thr Ser Gly Val Leu Val Cys
385                 390                 395                 400

Pro Asp Leu Ser Glu Phe Thr Arg Asp Lys Thr Asp Val Lys Ile Gln
            405                 410                 415

Trp Tyr Lys Asp Ser Leu Leu Leu Asp Lys Asp Asn Glu Lys Phe Leu
            420                 425                 430

Ser Val Arg Gly Thr Thr His Leu Leu Val His Asp Val Ala Leu Glu
            435                 440                 445

Asp Ala Gly Tyr Tyr Arg Cys Val Leu Thr Phe Ala His Glu Gly Gln
450                 455                 460

Gln Tyr Asn Ile Thr Arg Ser Ile Glu Leu Arg Ile Lys Lys Lys
465                 470                 475                 480

Glu Glu Thr Ile Pro Val Ile Ile Ser Pro Leu Lys Thr Ile Ser Ala
            485                 490                 495

Ser Leu Gly Ser Arg Leu Thr Ile Pro Cys Lys Val Phe Leu Gly Thr
            500                 505                 510

Gly Thr Pro Leu Thr Thr Met Leu Trp Trp Thr Ala Asn Asp Thr His
            515                 520                 525

Ile Glu Ser Ala Tyr Pro Gly Gly Arg Val Thr Glu Gly Pro Arg Gln
            530                 535                 540

Glu Tyr Ser Glu Asn Asn Glu Asn Tyr Ile Glu Val Pro Leu Ile Phe
545                 550                 555                 560

Asp Pro Val Thr Arg Glu Asp Leu His Met Asp Phe Lys Cys Val Val
            565                 570                 575

His Asn Thr Leu Ser Phe Gln Thr Leu Arg Thr Thr Val Lys Glu
            580                 585                 590

<210> SEQ ID NO 12
<211> LENGTH: 796
<212> TYPE: PRT
<213> ORGANISM: Artificial
<220> FEATURE:
<223> OTHER INFORMATION: Model 12  AntiCD123  IgG4 (CH2CH3)  IL1R2
      (extracellular)

<400> SEQUENCE: 12

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80
```

```
Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

Gly Thr Met Val Thr Val Ser Gly Gly Gly Ser Gly Gly Gly
        115                 120                 125

Gly Ser Gly Gly Gly Ser Asp Ile Val Met Thr Gln Ser Pro Asp
130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
            165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
            195                 200                 205

Gly Thr Asp Phe Thr Leu Thr Ile Ser Ser Leu Gln Ala Glu Asp Val
        210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Ala Pro Glu Phe Leu Gly Gly
            245                 250                 255

Pro Ser Val Phe Leu Phe Pro Pro Lys Pro Lys Asp Thr Leu Met Ile
            260                 265                 270

Ser Arg Thr Pro Glu Val Thr Cys Val Val Val Asp Val Ser Gln Glu
            275                 280                 285

Asp Pro Glu Val Gln Phe Asn Trp Tyr Val Asp Gly Val Glu Val His
            290                 295                 300

Asn Ala Lys Thr Lys Pro Arg Glu Glu Gln Phe Asn Ser Thr Tyr Arg
305                 310                 315                 320

Val Val Ser Val Leu Thr Val Leu His Gln Asp Trp Leu Asn Gly Lys
            325                 330                 335

Glu Tyr Lys Cys Lys Val Ser Asn Lys Gly Leu Pro Ser Ser Ile Glu
            340                 345                 350

Lys Thr Ile Ser Lys Ala Lys Gly Gln Pro Arg Glu Pro Gln Val Tyr
            355                 360                 365

Thr Leu Pro Pro Ser Gln Glu Glu Met Thr Lys Asn Gln Val Ser Leu
            370                 375                 380

Thr Cys Leu Val Lys Gly Phe Tyr Pro Ser Asp Ile Ala Val Glu Trp
385                 390                 395                 400

Glu Ser Asn Gly Gln Pro Glu Asn Asn Tyr Lys Thr Thr Pro Pro Val
            405                 410                 415

Leu Asp Ser Asp Gly Ser Phe Phe Leu Tyr Ser Arg Leu Thr Val Asp
            420                 425                 430

Lys Ser Arg Trp Gln Glu Gly Asn Val Phe Ser Cys Ser Val Met His
            435                 440                 445

Glu Ala Leu His Asn His Tyr Thr Gln Lys Ser Leu Ser Leu Ser Leu
450                 455                 460

Gly Lys Phe Thr Leu Gln Pro Ala Ala His Thr Gly Ala Ala Arg Ser
465                 470                 475                 480

Cys Arg Phe Arg Gly Arg His Tyr Lys Arg Glu Phe Arg Leu Glu Gly
            485                 490                 495
```

```
Glu Pro Val Ala Leu Arg Cys Pro Gln Val Pro Tyr Trp Leu Trp Ala
                500                 505                 510

Ser Val Ser Pro Arg Ile Asn Leu Thr Trp His Lys Asn Asp Ser Ala
            515                 520                 525

Arg Thr Val Pro Gly Glu Glu Thr Arg Met Trp Ala Gln Asp Gly
        530                 535                 540

Ala Leu Trp Leu Leu Pro Ala Leu Gln Glu Asp Ser Gly Thr Tyr Val
545                 550                 555                 560

Cys Thr Thr Arg Asn Ala Ser Tyr Cys Asp Lys Met Ser Ile Glu Leu
                565                 570                 575

Arg Val Phe Glu Asn Thr Asp Ala Phe Leu Pro Phe Ile Ser Tyr Pro
            580                 585                 590

Gln Ile Leu Thr Leu Ser Thr Ser Gly Val Leu Val Cys Pro Asp Leu
        595                 600                 605

Ser Glu Phe Thr Arg Asp Lys Thr Asp Val Lys Ile Gln Trp Tyr Lys
    610                 615                 620

Asp Ser Leu Leu Leu Asp Lys Asp Asn Glu Lys Phe Leu Ser Val Arg
625                 630                 635                 640

Gly Thr Thr His Leu Leu Val His Asp Val Ala Leu Glu Asp Ala Gly
                645                 650                 655

Tyr Tyr Arg Cys Val Leu Thr Phe Ala His Glu Gly Gln Gln Tyr Asn
            660                 665                 670

Ile Thr Arg Ser Ile Glu Leu Arg Ile Lys Lys Lys Lys Glu Glu Thr
        675                 680                 685

Ile Pro Val Ile Ile Ser Pro Leu Lys Thr Ile Ser Ala Ser Leu Gly
    690                 695                 700

Ser Arg Leu Thr Ile Pro Cys Lys Val Phe Leu Gly Thr Gly Thr Pro
705                 710                 715                 720

Leu Thr Thr Met Leu Trp Trp Thr Ala Asn Asp Thr His Ile Glu Ser
                725                 730                 735

Ala Tyr Pro Gly Gly Arg Val Thr Glu Gly Pro Arg Gln Glu Tyr Ser
            740                 745                 750

Glu Asn Asn Glu Asn Tyr Ile Glu Val Pro Leu Ile Phe Asp Pro Val
        755                 760                 765

Thr Arg Glu Asp Leu His Met Asp Phe Lys Cys Val Val His Asn Thr
    770                 775                 780

Leu Ser Phe Gln Thr Leu Arg Thr Thr Val Lys Glu
785                 790                 795

<210> SEQ ID NO 13
<211> LENGTH: 327
<212> TYPE: PRT
<213> ORGANISM: Artificial
<220> FEATURE:
<223> OTHER INFORMATION: IgG4 Heavy Chain  UniProtKB: P01861

<400> SEQUENCE: 13

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60
```

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
        115                 120                 125

Asp Thr Leu Met Ile Ser Arg Thr Pro Glu Val Thr Cys Val Val Val
    130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 14
<211> LENGTH: 98
<212> TYPE: PRT
<213> ORGANISM: Artificial
<220> FEATURE:
<223> OTHER INFORMATION: CH1 domain  1 to 98

<400> SEQUENCE: 14

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val

<210> SEQ ID NO 15
<211> LENGTH: 12
<212> TYPE: PRT
<213> ORGANISM: Artificial
<220> FEATURE:
<223> OTHER INFORMATION: Hinge  99 to 110

<400> SEQUENCE: 15

Glu Ser Lys Tyr Gly Pro Pro Cys Pro Ser Cys Pro
1               5                   10

<210> SEQ ID NO 16
<211> LENGTH: 110
<212> TYPE: PRT
<213> ORGANISM: Artificial
<220> FEATURE:
<223> OTHER INFORMATION: CH2 domain  111 to 220

<400> SEQUENCE: 16

Ala Pro Glu Phe Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser Gln Glu Asp Pro Glu Val Gln Phe Asn Trp Tyr
        35                  40                  45

Val Asp Gly Val Glu Val His Asn Ala Lys Thr Lys Pro Arg Glu Glu
    50                  55                  60

Gln Phe Asn Ser Thr Tyr Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Gly Leu Pro Ser Ser Ile Glu Lys Thr Ile Ser Lys Ala Lys
            100                 105                 110

<210> SEQ ID NO 17
<211> LENGTH: 107
<212> TYPE: PRT
<213> ORGANISM: Artificial
<220> FEATURE:
<223> OTHER INFORMATION: CH3 domain  221 to 327

<400> SEQUENCE: 17

Gly Gln Pro Arg Glu Pro Gln Val Tyr Thr Leu Pro Pro Ser Gln Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Arg Leu Thr Val Asp Lys Ser Arg Trp Gln Glu Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Leu Gly Lys
            100                 105

<210> SEQ ID NO 18

<211> LENGTH: 398
<212> TYPE: PRT
<213> ORGANISM: Artificial
<220> FEATURE:
<223> OTHER INFORMATION: IL1R2   UniProtKB: P27930

<400> SEQUENCE: 18

Met Leu Arg Leu Tyr Val Leu Val Met Gly Val Ser Ala Phe Thr Leu
1               5                   10                  15

Gln Pro Ala Ala His Thr Gly Ala Ala Arg Ser Cys Arg Phe Arg Gly
            20                  25                  30

Arg His Tyr Lys Arg Glu Phe Arg Leu Glu Gly Glu Pro Val Ala Leu
        35                  40                  45

Arg Cys Pro Gln Val Pro Tyr Trp Leu Trp Ala Ser Val Ser Pro Arg
    50                  55                  60

Ile Asn Leu Thr Trp His Lys Asn Asp Ser Ala Arg Thr Val Pro Gly
65                  70                  75                  80

Glu Glu Glu Thr Arg Met Trp Ala Gln Asp Gly Ala Leu Trp Leu Leu
                85                  90                  95

Pro Ala Leu Gln Glu Asp Ser Gly Thr Tyr Val Cys Thr Thr Arg Asn
            100                 105                 110

Ala Ser Tyr Cys Asp Lys Met Ser Ile Glu Leu Arg Val Phe Glu Asn
        115                 120                 125

Thr Asp Ala Phe Leu Pro Phe Ile Ser Tyr Pro Gln Ile Leu Thr Leu
    130                 135                 140

Ser Thr Ser Gly Val Leu Val Cys Pro Asp Leu Ser Glu Phe Thr Arg
145                 150                 155                 160

Asp Lys Thr Asp Val Lys Ile Gln Trp Tyr Lys Asp Ser Leu Leu Leu
                165                 170                 175

Asp Lys Asp Asn Glu Lys Phe Leu Ser Val Arg Gly Thr Thr His Leu
            180                 185                 190

Leu Val His Asp Val Ala Leu Glu Asp Ala Gly Tyr Tyr Arg Cys Val
        195                 200                 205

Leu Thr Phe Ala His Glu Gly Gln Gln Tyr Asn Ile Thr Arg Ser Ile
    210                 215                 220

Glu Leu Arg Ile Lys Lys Lys Lys Glu Glu Thr Ile Pro Val Ile Ile
225                 230                 235                 240

Ser Pro Leu Lys Thr Ile Ser Ala Ser Leu Gly Ser Arg Leu Thr Ile
                245                 250                 255

Pro Cys Lys Val Phe Leu Gly Thr Gly Thr Pro Leu Thr Thr Met Leu
            260                 265                 270

Trp Trp Thr Ala Asn Asp Thr His Ile Glu Ser Ala Tyr Pro Gly Gly
        275                 280                 285

Arg Val Thr Glu Gly Pro Arg Gln Glu Tyr Ser Glu Asn Asn Glu Asn
    290                 295                 300

Tyr Ile Glu Val Pro Leu Ile Phe Asp Pro Val Thr Arg Glu Asp Leu
305                 310                 315                 320

His Met Asp Phe Lys Cys Val Val His Asn Thr Leu Ser Phe Gln Thr
                325                 330                 335

Leu Arg Thr Thr Val Lys Glu Ala Ser Ser Thr Phe Ser Trp Gly Ile
            340                 345                 350

Val Leu Ala Pro Leu Ser Leu Ala Phe Leu Val Leu Gly Gly Ile Trp
        355                 360                 365

Met His Arg Arg Cys Lys His Arg Thr Gly Lys Ala Asp Gly Leu Thr
    370                 375                 380

```
Val Leu Trp Pro His His Gln Asp Phe Gln Ser Tyr Pro Lys
385                 390                 395
```

<210> SEQ ID NO 19
<211> LENGTH: 13
<212> TYPE: PRT
<213> ORGANISM: Artificial
<220> FEATURE:
<223> OTHER INFORMATION: Signal Peptide  1 to 13

<400> SEQUENCE: 19

```
Met Leu Arg Leu Tyr Val Leu Val Met Gly Val Ser Ala
1               5                   10
```

<210> SEQ ID NO 20
<211> LENGTH: 330
<212> TYPE: PRT
<213> ORGANISM: Artificial
<220> FEATURE:
<223> OTHER INFORMATION: Extracellular Domain  14 to 343

<400> SEQUENCE: 20

```
Phe Thr Leu Gln Pro Ala Ala His Thr Gly Ala Ala Arg Ser Cys Arg
1               5                   10                  15

Phe Arg Gly Arg His Tyr Lys Arg Glu Phe Arg Leu Glu Gly Glu Pro
                20                  25                  30

Val Ala Leu Arg Cys Pro Gln Val Pro Tyr Trp Leu Trp Ala Ser Val
            35                  40                  45

Ser Pro Arg Ile Asn Leu Thr Trp His Lys Asn Asp Ser Ala Arg Thr
50                  55                  60

Val Pro Gly Glu Glu Glu Thr Arg Met Trp Ala Gln Asp Gly Ala Leu
65                  70                  75                  80

Trp Leu Leu Pro Ala Leu Gln Glu Asp Ser Gly Thr Tyr Val Cys Thr
                85                  90                  95

Thr Arg Asn Ala Ser Tyr Cys Asp Lys Met Ser Ile Glu Leu Arg Val
            100                 105                 110

Phe Glu Asn Thr Asp Ala Phe Leu Pro Phe Ile Ser Tyr Pro Gln Ile
        115                 120                 125

Leu Thr Leu Ser Thr Ser Gly Val Leu Val Cys Pro Asp Leu Ser Glu
130                 135                 140

Phe Thr Arg Asp Lys Thr Asp Val Lys Ile Gln Trp Tyr Lys Asp Ser
145                 150                 155                 160

Leu Leu Leu Asp Lys Asp Asn Glu Lys Phe Leu Ser Val Arg Gly Thr
                165                 170                 175

Thr His Leu Leu Val His Asp Val Ala Leu Glu Asp Ala Gly Tyr Tyr
            180                 185                 190

Arg Cys Val Leu Thr Phe Ala His Glu Gly Gln Gln Tyr Asn Ile Thr
        195                 200                 205

Arg Ser Ile Glu Leu Arg Ile Lys Lys Lys Glu Glu Thr Ile Pro
    210                 215                 220

Val Ile Ile Ser Pro Leu Lys Thr Ile Ser Ala Ser Leu Gly Ser Arg
225                 230                 235                 240

Leu Thr Ile Pro Cys Lys Val Phe Leu Gly Thr Gly Thr Pro Leu Thr
                245                 250                 255

Thr Met Leu Trp Trp Thr Ala Asn Asp Thr His Ile Glu Ser Ala Tyr
            260                 265                 270

Pro Gly Gly Arg Val Thr Glu Gly Pro Arg Gln Glu Tyr Ser Glu Asn
```

```
                275                 280                 285

Asn Glu Asn Tyr Ile Glu Val Pro Leu Ile Phe Asp Pro Val Thr Arg
        290                 295                 300

Glu Asp Leu His Met Asp Phe Lys Cys Val Val His Asn Thr Leu Ser
305                 310                 315                 320

Phe Gln Thr Leu Arg Thr Thr Val Lys Glu
                325                 330

<210> SEQ ID NO 21
<211> LENGTH: 26
<212> TYPE: PRT
<213> ORGANISM: Artificial
<220> FEATURE:
<223> OTHER INFORMATION: Transmembrane Domain  344 to 369

<400> SEQUENCE: 21

Ala Ser Ser Thr Phe Ser Trp Gly Ile Val Leu Ala Pro Leu Ser Leu
1               5                   10                  15

Ala Phe Leu Val Leu Gly Gly Ile Trp Met
            20                  25

<210> SEQ ID NO 22
<211> LENGTH: 29
<212> TYPE: PRT
<213> ORGANISM: Artificial
<220> FEATURE:
<223> OTHER INFORMATION: Cytoplasmatic Domain  370 to 398

<400> SEQUENCE: 22

His Arg Arg Cys Lys His Arg Thr Gly Lys Ala Asp Gly Leu Thr Val
1               5                   10                  15

Leu Trp Pro His His Gln Asp Phe Gln Ser Tyr Pro Lys
            20                  25

<210> SEQ ID NO 23
<211> LENGTH: 529
<212> TYPE: PRT
<213> ORGANISM: Artificial
<220> FEATURE:
<223> OTHER INFORMATION: Anti CD33 CAR 3rd Generation

<400> SEQUENCE: 23

Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Gly Ser Gly Gly Gly Gly Ser Gly Gly
        115                 120                 125

Gly Gly Ser Asp Ile Gln Leu Thr Gln Ser Pro Ser Thr Leu Ser Ala
    130                 135                 140
```

```
Ser Val Gly Asp Arg Val Thr Ile Thr Cys Arg Ala Ser Glu Ser Leu
145                 150                 155                 160

Asp Asn Tyr Gly Ile Arg Phe Leu Thr Trp Phe Gln Gln Lys Pro Gly
                165                 170                 175

Lys Ala Pro Lys Leu Leu Met Tyr Ala Ala Ser Asn Gln Gly Ser Gly
            180                 185                 190

Val Pro Ser Arg Phe Ser Gly Ser Gly Ser Gly Thr Glu Phe Thr Leu
        195                 200                 205

Thr Ile Ser Ser Leu Gln Pro Asp Asp Phe Ala Thr Tyr Tyr Cys Gln
210                 215                 220

Gln Thr Lys Glu Val Pro Trp Ser Phe Gly Gln Gly Thr Lys Val Glu
225                 230                 235                 240

Val Lys Arg Thr Val Thr Thr Pro Ala Pro Arg Pro Pro Thr Pro
            245                 250                 255

Ala Pro Thr Ile Ala Ser Gln Pro Leu Ser Leu Arg Pro Glu Ala Cys
            260                 265                 270

Arg Pro Ala Ala Gly Gly Ala Val His Thr Arg Gly Leu Asp Phe Ala
        275                 280                 285

Cys Asp Phe Trp Val Leu Val Val Gly Gly Val Leu Ala Cys Tyr
        290                 295                 300

Ser Leu Leu Val Thr Val Ala Phe Ile Ile Phe Trp Val Arg Ser Lys
305                 310                 315                 320

Arg Ser Arg Leu Leu His Ser Asp Tyr Met Asn Met Thr Pro Arg Arg
                325                 330                 335

Pro Gly Pro Thr Arg Lys His Tyr Gln Pro Tyr Ala Pro Pro Arg Asp
            340                 345                 350

Phe Ala Ala Tyr Arg Ser Lys Arg Gly Arg Lys Lys Leu Leu Tyr Ile
        355                 360                 365

Phe Lys Gln Pro Phe Met Arg Pro Val Gln Thr Thr Gln Glu Glu Asp
370                 375                 380

Gly Cys Ser Cys Arg Phe Pro Glu Glu Glu Glu Gly Gly Cys Glu Leu
385                 390                 395                 400

Arg Val Lys Phe Ser Arg Ser Ala Asp Ala Pro Ala Tyr Lys Gln Gly
                405                 410                 415

Gln Asn Gln Leu Tyr Asn Glu Leu Asn Leu Gly Arg Arg Glu Glu Tyr
            420                 425                 430

Asp Val Leu Asp Lys Arg Arg Gly Arg Asp Pro Glu Met Gly Gly Lys
        435                 440                 445

Pro Arg Arg Lys Asn Pro Gln Glu Gly Leu Tyr Asn Glu Leu Gln Lys
        450                 455                 460

Asp Lys Met Ala Glu Ala Tyr Ser Glu Ile Gly Met Lys Gly Glu Arg
465                 470                 475                 480

Arg Arg Gly Lys Gly His Asp Gly Leu Tyr Gln Gly Leu Ser Thr Ala
                485                 490                 495

Thr Lys Asp Thr Tyr Asp Ala Leu His Met Gln Ala Leu Pro Pro Arg
            500                 505                 510

Pro Gly Ser Arg Pro Arg Leu Glu Gln Ser Thr Ser Gly Leu Gln Asn
        515                 520                 525

Leu

<210> SEQ ID NO 24
<211> LENGTH: 245
<212> TYPE: PRT
```

<213> ORGANISM: Artificial
<220> FEATURE:
<223> OTHER INFORMATION: AntiCD33 (VH liker VL) 1 to 245

<400> SEQUENCE: 24

```
Glu Val Gln Leu Val Gln Ser Gly Ala Glu Val Lys Lys Pro Gly Ser
1               5                   10                  15

Ser Val Lys Val Ser Cys Lys Ala Ser Gly Tyr Thr Ile Thr Asp Ser
            20                  25                  30

Asn Ile His Trp Val Arg Gln Ala Pro Gly Gln Ser Leu Glu Trp Ile
        35                  40                  45

Gly Tyr Ile Tyr Pro Tyr Asn Gly Gly Thr Asp Tyr Asn Gln Lys Phe
    50                  55                  60

Lys Asn Arg Ala Thr Leu Thr Val Asp Asn Pro Thr Asn Thr Ala Tyr
65                  70                  75                  80

Met Glu Leu Ser Ser Leu Arg Ser Glu Asp Thr Ala Phe Tyr Tyr Cys
                85                  90                  95

Val Asn Gly Asn Pro Trp Leu Ala Tyr Trp Gly Gln Gly Thr Leu Val
            100                 105                 110

Thr Val Ser Ser Gly Gly Gly Gly Ser Gly Gly Gly Gly Ser Gly Gly
        115                 120                 125

Gly Gly Ser Asp Ile Gln Leu Thr Gln Ser Pro Ser Thr Leu Ser Ala
    130                 135                 140

Ser Val Gly Asp Arg Val Thr Ile Thr Cys Arg Ala Ser Glu Ser Leu
145                 150                 155                 160

Asp Asn Tyr Gly Ile Arg Phe Leu Thr Trp Phe Gln Gln Lys Pro Gly
                165                 170                 175

Lys Ala Pro Lys Leu Leu Met Tyr Ala Ala Ser Asn Gln Gly Ser Gly
            180                 185                 190

Val Pro Ser Arg Phe Ser Gly Ser Gly Ser Gly Thr Glu Phe Thr Leu
        195                 200                 205

Thr Ile Ser Ser Leu Gln Pro Asp Asp Phe Ala Thr Tyr Tyr Cys Gln
    210                 215                 220

Gln Thr Lys Glu Val Pro Trp Ser Phe Gly Gln Gly Thr Lys Val Glu
225                 230                 235                 240

Val Lys Arg Thr Val
                245
```

<210> SEQ ID NO 25
<211> LENGTH: 45
<212> TYPE: PRT
<213> ORGANISM: Artificial
<220> FEATURE:
<223> OTHER INFORMATION: CD8 Hinge 246 to 290

<400> SEQUENCE: 25

```
Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45
```

<210> SEQ ID NO 26
<211> LENGTH: 239
<212> TYPE: PRT
<213> ORGANISM: Artificial
<220> FEATURE:

<223> OTHER INFORMATION: Intracelular Domains 291 to 580

<400> SEQUENCE: 26

Phe Trp Val Leu Val Val Gly Gly Val Leu Ala Cys Tyr Ser Leu
1               5                   10                  15

Leu Val Thr Val Ala Phe Ile Ile Phe Trp Val Arg Ser Lys Arg Ser
            20                  25                  30

Arg Leu Leu His Ser Asp Tyr Met Asn Met Thr Pro Arg Arg Pro Gly
            35                  40                  45

Pro Thr Arg Lys His Tyr Gln Pro Tyr Ala Pro Pro Arg Asp Phe Ala
        50                  55                  60

Ala Tyr Arg Ser Lys Arg Gly Arg Lys Lys Leu Tyr Ile Phe Lys
65                  70                  75                  80

Gln Pro Phe Met Arg Pro Val Gln Thr Thr Gln Glu Glu Asp Gly Cys
                85                  90                  95

Ser Cys Arg Phe Pro Glu Glu Glu Glu Gly Gly Cys Glu Leu Arg Val
            100                 105                 110

Lys Phe Ser Arg Ser Ala Asp Ala Pro Ala Tyr Lys Gln Gly Gln Asn
        115                 120                 125

Gln Leu Tyr Asn Glu Leu Asn Leu Gly Arg Arg Glu Glu Tyr Asp Val
    130                 135                 140

Leu Asp Lys Arg Arg Gly Arg Asp Pro Glu Met Gly Gly Lys Pro Arg
145                 150                 155                 160

Arg Lys Asn Pro Gln Glu Gly Leu Tyr Asn Glu Leu Gln Lys Asp Lys
                165                 170                 175

Met Ala Glu Ala Tyr Ser Glu Ile Gly Met Lys Gly Glu Arg Arg Arg
            180                 185                 190

Gly Lys Gly His Asp Gly Leu Tyr Gln Gly Leu Ser Thr Ala Thr Lys
        195                 200                 205

Asp Thr Tyr Asp Ala Leu His Met Gln Ala Leu Pro Pro Arg Pro Gly
    210                 215                 220

Ser Arg Pro Arg Leu Glu Gln Ser Thr Ser Gly Leu Gln Asn Leu
225                 230                 235

<210> SEQ ID NO 27
<211> LENGTH: 516
<212> TYPE: PRT
<213> ORGANISM: Artificial
<220> FEATURE:
<223> OTHER INFORMATION: Anti CD123 CAR 3rd Generation

<400> SEQUENCE: 27

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

```
Gly Thr Met Val Thr Val Ser Ser Gly Gly Gly Ser Gly Gly
            115                 120                 125

Gly Ser Gly Gly Gly Ser Asp Ile Val Met Thr Gln Ser Pro Asp
130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg Thr Thr Pro Ala Pro Arg
                245                 250                 255

Pro Pro Thr Pro Ala Pro Thr Ile Ala Ser Gln Pro Leu Ser Leu Arg
                260                 265                 270

Pro Glu Ala Cys Arg Pro Ala Ala Gly Gly Ala Val His Thr Arg Gly
            275                 280                 285

Leu Asp Phe Ala Cys Asp Phe Trp Val Leu Val Val Gly Gly Val
        290                 295                 300

Leu Ala Cys Tyr Ser Leu Leu Val Thr Val Ala Phe Ile Ile Phe Trp
305                 310                 315                 320

Val Arg Ser Lys Arg Ser Arg Leu Leu His Ser Asp Tyr Met Asn Met
                325                 330                 335

Thr Pro Arg Arg Pro Gly Pro Thr Arg Lys His Tyr Gln Pro Tyr Ala
                340                 345                 350

Pro Pro Arg Asp Phe Ala Ala Tyr Arg Ser Lys Arg Gly Arg Lys Lys
            355                 360                 365

Leu Leu Tyr Ile Phe Lys Gln Pro Phe Met Arg Pro Val Gln Thr Thr
        370                 375                 380

Gln Glu Glu Asp Gly Cys Ser Cys Arg Phe Pro Glu Glu Glu Glu Gly
385                 390                 395                 400

Gly Cys Glu Leu Arg Val Lys Phe Ser Arg Ser Ala Asp Ala Pro Ala
                405                 410                 415

Tyr Lys Gln Gly Gln Asn Gln Leu Tyr Asn Glu Leu Asn Leu Gly Arg
            420                 425                 430

Arg Glu Glu Tyr Asp Val Leu Asp Lys Arg Arg Gly Arg Asp Pro Glu
        435                 440                 445

Met Gly Gly Lys Pro Arg Arg Lys Asn Pro Gln Glu Gly Leu Tyr Asn
    450                 455                 460

Glu Leu Gln Lys Asp Lys Met Ala Glu Ala Tyr Ser Glu Ile Gly Met
465                 470                 475                 480

Lys Gly Glu Arg Arg Arg Gly Lys Gly His Asp Gly Leu Tyr Gln Gly
                485                 490                 495

Leu Ser Thr Ala Thr Lys Asp Thr Tyr Asp Ala Leu His Met Gln Ala
            500                 505                 510

Leu Pro Pro Arg
        515
```

```
<210> SEQ ID NO 28
<211> LENGTH: 249
<212> TYPE: PRT
<213> ORGANISM: Artificial
<220> FEATURE:
<223> OTHER INFORMATION: AntiCD123 (VH liker VL)  1 to 249

<400> SEQUENCE: 28

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45

Gly Asp Ile Ile Pro Ser Asn Gly Ala Thr Phe Tyr Asn Gln Lys Phe
    50                  55                  60

Lys Gly Gln Val Thr Ile Ser Ala Asp Lys Ser Ile Ser Thr Thr Tyr
65                  70                  75                  80

Leu Gln Trp Ser Ser Leu Lys Ala Ser Asp Thr Ala Met Tyr Tyr Cys
                85                  90                  95

Ala Arg Ser His Leu Leu Arg Ala Ser Trp Phe Ala Tyr Trp Gly Gln
            100                 105                 110

Gly Thr Met Val Thr Val Ser Ser Gly Gly Gly Gly Ser Gly Gly Gly
        115                 120                 125

Gly Ser Gly Gly Gly Gly Ser Asp Ile Val Met Thr Gln Ser Pro Asp
    130                 135                 140

Ser Leu Ala Val Ser Leu Gly Glu Arg Ala Thr Ile Asn Cys Glu Ser
145                 150                 155                 160

Ser Gln Ser Leu Leu Asn Ser Gly Asn Gln Lys Asn Tyr Leu Thr Trp
                165                 170                 175

Tyr Gln Gln Lys Pro Gly Gln Pro Pro Lys Pro Leu Ile Tyr Trp Ala
            180                 185                 190

Ser Thr Arg Glu Ser Gly Val Pro Asp Arg Phe Ser Gly Ser Gly Ser
        195                 200                 205

Gly Thr Asp Phe Thr Leu Thr Ile Ser Ser Leu Gln Ala Glu Asp Val
    210                 215                 220

Ala Val Tyr Tyr Cys Gln Asn Asp Tyr Ser Tyr Pro Tyr Thr Phe Gly
225                 230                 235                 240

Gln Gly Thr Lys Leu Glu Ile Lys Arg
                245

<210> SEQ ID NO 29
<211> LENGTH: 45
<212> TYPE: PRT
<213> ORGANISM: Artificial
<220> FEATURE:
<223> OTHER INFORMATION: CD8 Hinge  250 to 294

<400> SEQUENCE: 29

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 30
```

```
<211> LENGTH: 222
<212> TYPE: PRT
<213> ORGANISM: Artificial
<220> FEATURE:
<223> OTHER INFORMATION: Intracellular Domains 295 to 517

<400> SEQUENCE: 30

Phe Trp Val Leu Val Val Gly Gly Val Leu Ala Cys Tyr Ser Leu
1               5                   10                  15

Leu Val Thr Val Ala Phe Ile Ile Phe Trp Val Arg Ser Lys Arg Ser
                20                  25                  30

Arg Leu Leu His Ser Asp Tyr Met Asn Met Thr Pro Arg Arg Pro Gly
            35                  40                  45

Pro Thr Arg Lys His Tyr Gln Pro Tyr Ala Pro Pro Arg Asp Phe Ala
        50                  55                  60

Ala Tyr Arg Ser Lys Arg Gly Arg Lys Lys Leu Leu Tyr Ile Phe Lys
65                  70                  75                  80

Gln Pro Phe Met Arg Pro Val Gln Thr Thr Gln Glu Glu Asp Gly Cys
                85                  90                  95

Ser Cys Arg Phe Pro Glu Glu Glu Glu Gly Gly Cys Glu Leu Arg Val
            100                 105                 110

Lys Phe Ser Arg Ser Ala Asp Ala Pro Ala Tyr Lys Gln Gly Gln Asn
        115                 120                 125

Gln Leu Tyr Asn Glu Leu Asn Leu Gly Arg Arg Glu Glu Tyr Asp Val
    130                 135                 140

Leu Asp Lys Arg Arg Gly Arg Asp Pro Glu Met Gly Gly Lys Pro Arg
145                 150                 155                 160

Arg Lys Asn Pro Gln Glu Gly Leu Tyr Asn Glu Leu Gln Lys Asp Lys
                165                 170                 175

Met Ala Glu Ala Tyr Ser Glu Ile Gly Met Lys Gly Glu Arg Arg Arg
            180                 185                 190

Gly Lys Gly His Asp Gly Leu Tyr Gln Gly Leu Ser Thr Ala Thr Lys
        195                 200                 205

Asp Thr Tyr Asp Ala Leu His Met Gln Ala Leu Pro Pro Arg
    210                 215                 220
```